(12) United States Patent
Cioffi et al.

(10) Patent No.: US 11,601,255 B2
(45) Date of Patent: Mar. 7, 2023

(54) WIRELESS-WIRELINE PHYSICALLY CONVERGED ARCHITECTURES

(71) Applicant: ASSIA SPE, LLC, Wilmington, DE (US)

(72) Inventors: John M. Cioffi, Atherton, CA (US); Chan-Soo Hwang, Seoul (KR); Ioannis Kanellakopoulos, Redwood City, CA (US); Jisung Oh, Palo Alto, CA (US); Kenneth J. Kerpez, Long Valley, NJ (US)

(73) Assignee: ASSIA SPE, LLC, Wilmington, DE (US)

( * ) Notice: Subject to any disclaimer, the term of this patent is extended or adjusted under 35 U.S.C. 154(b) by 118 days.

(21) Appl. No.: 17/033,437

(22) Filed: Sep. 25, 2020

(65) Prior Publication Data
US 2021/0099277 A1   Apr. 1, 2021

Related U.S. Application Data

(60) Provisional application No. 63/069,635, filed on Aug. 24, 2020, provisional application No. 62/908,919, (Continued)

(51) Int. Cl.
*H04L 5/14*   (2006.01)
*H04L 5/00*   (2006.01)

(52) U.S. Cl.
CPC .......... *H04L 5/1469* (2013.01); *H04L 5/0005* (2013.01); *H04L 5/0053* (2013.01); *H04L 5/1438* (2013.01)

(58) Field of Classification Search
CPC ... H04L 5/1469; H04L 5/0005; H04L 5/0053; H04L 5/1438; H04L 27/2647;
(Continued)

(56) References Cited

U.S. PATENT DOCUMENTS

| 7,747,292 B2 | 6/2010 | Mezer et al. |
| 9,107,203 B2 | 8/2015 | Spagnolini et al. |

(Continued)

FOREIGN PATENT DOCUMENTS

| EP | 2540134 B1 | 10/2016 |
| WO | 2016128045 A1 | 8/2016 |
| WO | 2018093301 A1 | 5/2018 |

OTHER PUBLICATIONS

J. Gambini and U. Spagnolini, "Wireless over Cable for Femtocell Systems," IEEE Communications Magazine, vol. 51, No. 5, pp. 178-185, May 13, 2013, (26 pgs).
(Continued)

*Primary Examiner* — Kiet Tang
(74) *Attorney, Agent, or Firm* — North Weber & Baugh LLP; Michael North

(57) ABSTRACT

Embodiments of the present invention provide systems, devices and methods for improving the performance and range of wireless communication systems. In various embodiments, a wireless and wireline architecture is implemented to allow a channel to more efficiently span physical barriers within the channel. The wireline portion of the channel may leverage pre-existing copper deployed within a building by interfacing copper with north and south transceiver nodes that allow the signal to propagate through a physical structure on the wire itself resulting in significantly less signal degradation compared to the signal having to traverse the physical structure wirelessly.

20 Claims, 17 Drawing Sheets

Related U.S. Application Data filed on Oct. 1, 2019, provisional application No. 62/907,035, filed on Sep. 27, 2019.

(58) Field of Classification Search
CPC .. H04L 27/2614; H04W 16/26; H04W 92/02; H04W 16/32; H04W 72/0433; H04B 3/32
See application file for complete search history.

(56) References Cited

U.S. PATENT DOCUMENTS

| | | | |
|---|---|---|---|
| 9,918,327 | B2 | 3/2018 | Lu et al. |
| 10,333,584 | B2 | 6/2019 | Spagnolini |
| 2003/0012308 | A1* | 1/2003 | Sampath ............. H04L 27/2647 375/340 |
| 2008/0151743 | A1 | 6/2008 | Tong et al. |
| 2008/0159421 | A1* | 7/2008 | Chen ................... H04L 27/2614 375/295 |
| 2012/0264467 | A1 | 10/2012 | Maruta |
| 2016/0249370 | A1* | 8/2016 | Lu ......................... H04W 16/32 |
| 2016/0254889 | A1 | 9/2016 | Shattil |
| 2016/0337105 | A1 | 11/2016 | Lawton et al. |
| 2017/0373890 | A1 | 12/2017 | Fertonani et al. |
| 2018/0294903 | A1* | 10/2018 | Goodman ......... H04W 72/0433 |
| 2018/0351601 | A1* | 12/2018 | Spagnolini ............... H04B 1/40 |

OTHER PUBLICATIONS

S. Hassan et al., "On the Transport Capability of LAN Cables in All-Analog MIMO-RoC Fronthaul," in IEEE Wireless Communications & Networking Conference, Mar. 19, 2017, (6 pgs).
Matera et al., "Analog MIMO Radio-Over-Copper Downlink With Space-Frequency to Space-Frequency Multiplexing for Multi-User 5G Indoor Deployments,"IEEE Transactions on Wireless Communication, vol. 18, No. 5, pp. 2813-2827, May 2019, (3 pgs).
Y. Huang et al., "LIE Over Copper—Potential and Limitations," in IEEE 26th International Symposium on Personal, Indoor and Mobile Radio Communications—(PIMRC): Mobile and Wireless Networks, Hong Kong, Aug. 30, 2015, (5 pgs).
J. Botha, "The FOA Outside Plant Fiber Optics Construction Guide", Fiber Optics Association, 2019, (6 pgs).
Handelsblatt Today, "Mobile carriers' next challenge: finding the money for 5G," 23, 2018. Available Online: <URL: https://www.handelsblatt.com/today/companies/200-300-billion-mobile-carriers-next-challenge-finding-the-money-for-5g/23581238.html?ticket=ST-48284083-y7IUFOe0vtVy0fr6CtsD-ap3>, (4 pgs).
European Telecommunications Standards Institute (ETSI), "Technical Specification 101 548; European Requirements for Reverse Powering of Remote Access Equipment, V2.1.1," ETSI, 650 Route des Lucioles F-06921 Sophia Antipolis Cedex-France, Sep. 2016, (102 pgs).
Hu, Y. Zhang et al., "Distributed Antenna Systems: Open Architecture for Future Wireless Communication", Boca Raton, Florida: Auerbach Publications, 2019. Available Online: <URL:https://books.google.com/ books?hl=en&lr=&id=2RrbB17RYxoC&oi=fnd&pg=PP1&dq=H.+Hu,+Y.+Zha#v=onepage&q&f=false>. (1 pg).
"Common Public Radio Interface, CPRI, Requirements for the eCPRI Transport Network", Ericsson AB, Huawei Technologies Co. Ltd, NEC Corporation and Nokia, Oct. 24, 2017, (14 pgs).
5G PPP, "5G-Xhaul—Dynamically Reconfigurable Optical-Wireless Backhaul/Fronthaul with Cognitive Control Plane for Small Cells and Cloud-RANs," Horizon 2020 Program of European Commission, Jun. 30, 2016. Available Online: <URL:https://www.5g-xhaul-project.eu/publication_deliverables.html> (1 pg).
I. A. Alimi et al., "Toward an Efficient C-RAN Optical Fronthaul for the Future Networks: A Tutorial on Technologies, Requirements, Challenges, and Solutions", IEEE Communications Surveys and Tutorials, vol. 20, No. 1, pp. 708-769, 2018, (3 pgs).
Cioffi et al., "Terabit DSLs (invited paper)", IEEE Communications Magazine, vol. 56, No. 11, pp. 152-159, Nov. 2018, (8 pgs).
Chapter 10, EE379B. Channel Coding, (143 pgs).
Chapter 11, EE379B. Code Concatenation And Advanced Codes, (69 pgs).
Chapter 4, EE379C. Multi-Channel Modulation, (172 pgs).
Chapter 5, EE379C. Generalized Decision Feedback Equalization, (188 pgs).
Chapter 12, EE479. Multi-User Fundamentals, (61 pgs).
Chapter 13, EE479. The Gaussian Vector Multiple Access Channel, (53 pgs).
Chapter 14, EE479. The Gaussian Vector Broadcast Channel, (40 pgs).
Chapter 15, EE479. The Gaussian Interference Channel, (34 pgs).
Fuyun Ling, "Synchronization in Digital Communication Systems", Cambridge University Press, Jun. 2, 2017, (399 pgs).
Zaidi et al., "5G Physical Layer, Principles, Models and Technology Components", London, Academic Press, ISBN: 978-0-12-814578-4, published 2018, (131 pgs, chapter 1-4).
Zaidi et al., "5G Physical Layer, Principles, Models and Technology Components", London, Academic Press, ISBN: 978-0-12-814578-4, published 2018, (183 pgs, chapter 5-9).
Stephen B. Wicker, "Error Control Systems for Digital Communication and Storage", Upper Sadde River, NJ, Prentice Hall, 1995, (pp. 1-93; 53 pgs).
Stephen B. Wicker, "Error Control Systems for Digital Communication and Storage", Upper Sadde River, NJ, Prentice Hall, 1995, (pp. 94-215; 56 pgs).
Stephen B. Wicker, "Error Control Systems for Digital Communication and Storage", Upper Sadde River, NJ, Prentice Hall, 1995, (pp. 216-337; 45 pgs).
Stephen B. Wicker, "Error Control Systems for Digital Communication and Storage", Upper Sadde River, NJ, Prentice Hall, 1995, (pp. 338-415; 40 pgs).
Stephen B. Wicker, "Error Control Systems for Digital Communication and Storage", Upper Sadde River, NJ, Prentice Hall, 1995, (pp. 416-493; 39 pgs).
Stephen B. Wicker, "Error Control Systems for Digital Communication and Storage", Upper Sadde River, NJ, Prentice Hall, 1995, (pp. 494-512; 10 pgs).
Chowdhury et al., "Hybrid Automatic Repeat Request in LTE", Rochester Institute of Technology, Dubai, U.A.E., Aug. 31, 2013, (17 pgs).
Lee et al., "A Survey of Radio Resource Management for Spectrum Aggregation in LTE-Advanced", 2014, IEEE Communications Surveys & Tutorials, vol. 16, No. 2.
pp. 745-760, available from the Internet: <URL: https://corac.uk/download/pdf/30340884.pdf>, (16 pgs).
J. M. Cioffi, "Digital Data Transmission", Jul. 3, 2020, Available from the Internet, <URL:https://web.stanford.edu/group/cioffi/book.pdf>, EE379ABC, EE479.
Part I Modulation and Canonical Reception, (203 pgs). Chapters for EE379A: ch01, ch02, ch03, ch06. Chapters for EE379B: ch08, ch09, ch10, ch11.
Chapters for EE379C: ch04, ch05. Chapters for EE479: ch12, ch13, ch14, ch15.
Chapter 02, EE379A. Coding Basics and multiple users, (211 pgs).
Chapter 03, EE379A. Equalization, (198 pgs).
Chapter 06, EE379A. Fundamentals of Synchronization, (97 pgs).
Chapter 08, EE379B. Part II Coding Basics and multiple users, (35 pgs).
Chapter 09, EE379B. Decoding Algorithms, (80 pgs).
S. Rabi et al., "A Wire Waveguide Channel for Terabit-Per-Second Links," Applied Physics Letters, Mar. 31, 2020, (5 pgs).
L. Miller, "Carrier Aggregation for Dummies", Hoboken, NJ: John Wiley & Sons, Inc. 2016, (28 pgs).
G. M. Garner, "IEEE 1588 version 2," in ISPCS, Ann Arbor, Sep. 24, 2008, (89 pgs).
3GPP TR 21.916, "Long Term Evolution—Release 16," in Release Description, Release 16, Dec. 2019, (4 pgs).
E. Perahia et al., "Next Generation Wireless LANS", Second Edition 802.11n and 802.11ac, vols. ISBN 978-1-107-01676-7, Cambridge University Press, Jun. 2013, (6 pgs).
High-Level Data Link Control, Jan. 9, 2020. Available Online: <URL: https://en.wikipedia.org/wiki/High-Level_Data_Link_Control>, [Accessed Feb. 7, 2020], (14 pgs).

(56) References Cited

OTHER PUBLICATIONS

Cioffi et al., "Optimum Equivalent Loading in Multi-Dimensional Transmission," IEEE Open Journal of the Communications Society, vol. 1, pp. 681-686, Jun. 8, 2020, (19 pgs).
Gamal et al., "Bounds on Capacity and Minimum Energy-Per-Bit for AWGN Relay Channels", IEEE Transactions on Information Theory, vol. 52, No. 4, pp. 1545-1561, Apr. 2006, 17pgs.
Intl Telecommunications Union, "G.998.4: Improved impulse noise protection for digital subscribeline (DSL) transceivers," Geneva, Switzerland, Mar. 27, 2019, (126 pgs).
Cioffi et al., "Ergodic Spectrum Management", invited paper, IEEE Transactions on Communications, vol. 68, No. 3, pp. 1794-1821, Mar. 2020, (28 pgs).
Lee et al., "A Survey of Radio Resource Management for Spectrum Aggregation in LTE-Advanced", 2014, IEEE Communications Surveys & Tutorials, vol. 16, pp. 745-760.
Available from the Internet, <https://core.ac.uk/download/pdf/30340884.pdf>, Chapters for EE379A: ch01, ch02, ch03, ch06. Chapters for EE379B: ch08, ch09, ch10, ch11.
Chapter 01, EE379A. Modulation and Canonical Reception, (203 pgs).
Search Report and Written Opinion of the International Searching Authority, dated Dec. 2, 2020 in related PCT application No. PCT/US2020/52928, filed on Sep. 25, 2020, (11 pgs).
IEEE P1905 Working Group, "IEEE P1905-2013 Standard for a Convergent Digital Home Network for Heterogeneous Technologies," IEEE, Apr. 12, 2013, (93 pgs).
Matera et al., "Space-Frequency to Space-Frequency for MIMO Radio over Copper," in IEEE ICC SAC Symposium Access Systems and Networks Track, Paris, May 21, 2017, (6 pgs).
Kasturia et al., "Vector Coding for Partial Response Channels", IEEE Transactions on Information Theory, vol. 36, No. 4, pp. 741-762, Jul. 4, 1990, (22 pgs).
Bjomson et al., "Massive MIMO: Ten Myths and One Critical Question", IEEE Communications Magazine, pp. 114-122, Feb. 2016, arXiv:1503.06854v2, Aug. 18, 2015, (10 pgs).
Cendrillon et al., "Iterative Spectrum Balacing for Digital Subscriber Lines", in International Conference on Communications, Seoul Korea, May 2005, (6 pgs).
Lu et al., "Connecting the dots: small cells shape up for high-performance indoor radio", Ericsson Review, pp. 1-10, Dec. 19, 2014, (10 pgs).
Aldababsa et al., "A Tutorial on Nonorthogonal Multiple Access for 5G and Beyond", Wireless Communications and Mobile Computing, vol. 2018, pp. 1-24, Jun. 28, 2018, (25 pgs).
Cioffi et al., "Roadmap to Terabit DSLs", in TNO Conference, The Hague, Netherlands, Jun. 20, 2018, (23 pgs).
Ericsson AB, Huawei Technologies Co. Ltd, NEC Corporation, Alcatel Lucent, and Nokia Networks, "Common Public Radio Interface (CPRI); Interface Specification V7.0", Oct. 9, 2015. Available from the Internet: <URL:http://www.cpri.info/downloads/CPRI_v_7_0_2015-10-09.pdf>, (128 pgs).
Gambini et al., "Radio over Telephone Lines in Femtocell Systems", in 21st Annual IEEE International Symposium on Personal, Indoor, and Mobile Radio Communications, Istanbul, Turkey, Sep. 26, 2010, (6 pgs).
Starr et al., "DSL Advances", chapter 11, Upper Saddle River, NJ, Prentice Hall, 2003. (589 pgs).
Jagannathan et al., "Common-Mode Data Transmission Using the Binder Sheath in Digital Subscriber Lines", IEEE Tran. on Communications, vol. 57, No. 2, Feb. 2009, (11 pgs).
Heath et al., "Foundations of MIMO Communications", Cambridge University Press, UK, 2019, (803 pgs).
Paul Spruyt, "Achievements & Advancements in Next-Gen Copper Access", Nokia Fixed Networks, xDSL Strategies, The Netherlands, Jun. 26, 2019, (31 pgs).
Indian office action dated Aug. 26, 2022 in related Indian application No. 202217022319, (5 pgs).
Response to Indian office action filed Oct. 26, 2022 in related Indian application No. 202217022319, (8 pgs).

* cited by examiner

WIRELESS-WIRELINE PHYSICALLY CONVERGED ARCHITECTURES

CROSS-REFERENCE TO RELATED APPLICATIONS

This patent application is related to and claims priority benefit to the following commonly-owned U.S. provisional patent applications: U.S. Pat. App. Ser. No. 62/907,035, filed on Sep. 27, 2019, entitled "Wireless-Wireline Physically Converged Architectures," and listing John M. Cioffi, Chan-Soo Hwang, Ioannis Kanellakopoulos and Jisung Oh as inventors; and commonly-owned U.S. Pat. App. Ser. 62/908,919, filed on Oct. 1, 2019, entitled "Wireless-Wireline Physically Converged Architectures," and listing John M. Cioffi, Chan-Soo Hwang, Ioannis Kanellakopoulos and Jisung Oh as inventors; and commonly-owned U.S. Pat. App. Ser. No. 63/069,635, filed on Aug. 24, 2020, entitled "Wireless-Wireline Physically Converged Architectures," and listing John M. Cioffi, Chan-Soo Hwang, Ioannis Kanellakopoulos, Jisung Oh and Kenneth Kerpez as inventors. Each reference mentioned in this patent document is herein incorporated by reference in its entirety.

BACKGROUND

A. Technical Field

The present invention relates generally to telecommunication systems, and more particularly, to wireless and wireline communication architectures that improve performance and extend channel range by incorporating wired transmission across physical barriers within one or more channels in a cell or wireless network.

B. Background of the Invention

One skilled in the art will understand the importance of wireless communication systems (including LTE, 5G, 5GNR and Wi-Fi architectures) and the complexity of these systems as they are built-out and maintained around the world. Technological advancements have resulted in drastic performance improvements and bandwidth gains that provide users a richer and more dynamic experience using their wireless devices. As the complexity of these systems increases and the resources available to them are allocated across an increasingly higher frequency spectrum, the management of wireless channels becomes more challenging. For example, a cellular base station must manage a large number of channels in communicating with UEs (User Equipment) devices within its cell while the characteristics of these channels are constantly changing. This management of channels becomes more challenging in dense cities in which wireless signals must traverse a variety of physical barriers to reach a UE such as a cellphone. This channel quality and range issue is particularly problematic when channel frequencies increase and are more sensitive to interference, noise and varying channel properties.

Physical barriers such as buildings, walls, and other solid structures may cause a wireless signal to degrade significantly as it propagates through the solid structure. Many users have experienced a cellular connection within a building being less optimal and were required to move outside the building to achieve a better connection to a base station. This type of signal degradation is particularly problematic for more-recent wireless technologies that operate in higher frequency spectra, which result in an increased sensitivity to physical barriers. To address this problem, service providers or companies deploy expensive equipment such as small cell towers to extend the range of wireless signals into buildings and other similar structures. However, for many households and smaller companies, these expensive solutions are cost prohibitive and not viable.

Accordingly, what is needed are systems, devices and methods that address the above-described issues.

SUMMARY OF THE INVENTION

Embodiments of the present invention provide systems, devices and methods for improving the performance and range of wireless communication systems. In various embodiments, a wireless and wireline architecture is implemented to allow a channel to more efficiently span physical barriers within the channel. The wireline portion of the channel may leverage pre-existing copper deployed within a building by interfacing copper with "north" (facing the base station, Access Point, etc.) and "south" (facing the UE, mobile phone, IoT device, etc.) transceiver nodes that allow the signal to propagate through a physical structure on the wire itself resulting in significantly less signal degradation compared to the signal having to traverse the physical structure wirelessly.

The application of this wireless and wireline architecture is particularly relevant to LTE, 5G and Wi-Fi deployments. LTE's advance through 4G releases and to 5G releases has leveraged well the multicarrier modulation methods deployed in earlier DSL networks, including also LTE's Multiple-Input-Multiple Output (hereinafter, "MIMO") and Multi-User MIMO (hereinafter, "MU-MIMO") that are similar to DSL's vectoring methods, particularly for large numbers of antennas. This synergy suggests the potential direct use of 5G baseband-modulation methods on copper lines, extended through frequency heterodyning at the customer's premises for connection to/from desired end-devices.

LTE's coded-OFDM methods in such wireless use have only small performance loss with respect to the related DMT methods developed and optimized specifically for copper, if LTE's wireless Modulation-Coding-System (MCS) parameters and channel selection are well activated and used. Exploitation of existing wireless baseband MIMO and MU-MIMO systems leads to further improvement and may increase the range and efficiency of mesh or multi-access-point wireless deployments. These LTE-wireless, or Wi-Fi-wireless, MCS and MIMO methods' re-use on copper can lead to many improvements in cost, in infrastructure leverage, and in acceleration of 5G residential networks' economically profitable deployment.

There are globally more than 1 billion residential twisted-pair wireline connections, which form an infrastructure basis that can facilitate 5G mini-tower deployment. Many of these wireline connections have shortened copper links as fiber deployment increasingly migrates closer to the customer premises. The last copper link's replacement with fiber, however, is extremely expensive, because fiber's infrastructure-building costs then are incurred for only one customer. With fiber-to-the-basement, wireline twisted pairs, or, in some cases, home-run single coax, are used within multiple dwelling units because those interior copper links to residential living units already exist. By contrast, in-building fiber-installation costs can be unacceptably high or may violate construction laws and need special permits. From an expanded wireless-deployment perspective, LTE's wireless transmissions—especially as carrier frequencies increase— already have problems penetrating building walls. The copper links already penetrate the walls and were typically installed at the building's initial construction. 5G's even higher carrier frequencies penetrate walls yet less well, and thus 5G network service providers face increased infrastructure costs to build more cell towers closer to end-devices, or to place their equivalents inside buildings or rooms. Additionally, the copper links allow power delivery from either end of the wire to the other, eliminating the possible issue of no power at a cell site (or conversely removing the need for local batteries to ensure service continuity inside a building). All these performance and economic efficiency possibilities encourage and motivate this work.

Embodiments of the invention may also employ cloud-based management and target more recent wider-frequency-band and multiple-input-multiple-output LTE and Wi-Fi transmission systems.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Embodiments of the present invention provide systems, devices and methods for improving the performance of wireless communication systems by implementing a wireless and wireline architecture across various channels within the system. In certain examples, the architecture leverages pre-existing copper within a building to allow a signal to traverse physical barriers, such as walls, on copper wire while using wireless portions of the channel to communicate signals in air both outside and inside the building.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different electrical components, circuits, devices and systems. The embodiments of the present invention may function in various different types of environments wherein channel sensitivity and range are adversely affected by physical barriers within the signal path. Furthermore, connections between components within the figures are not intended to be limited to direct connections. Rather, connections between these components may be modified, reformatted or otherwise changed by intermediary components.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1A:
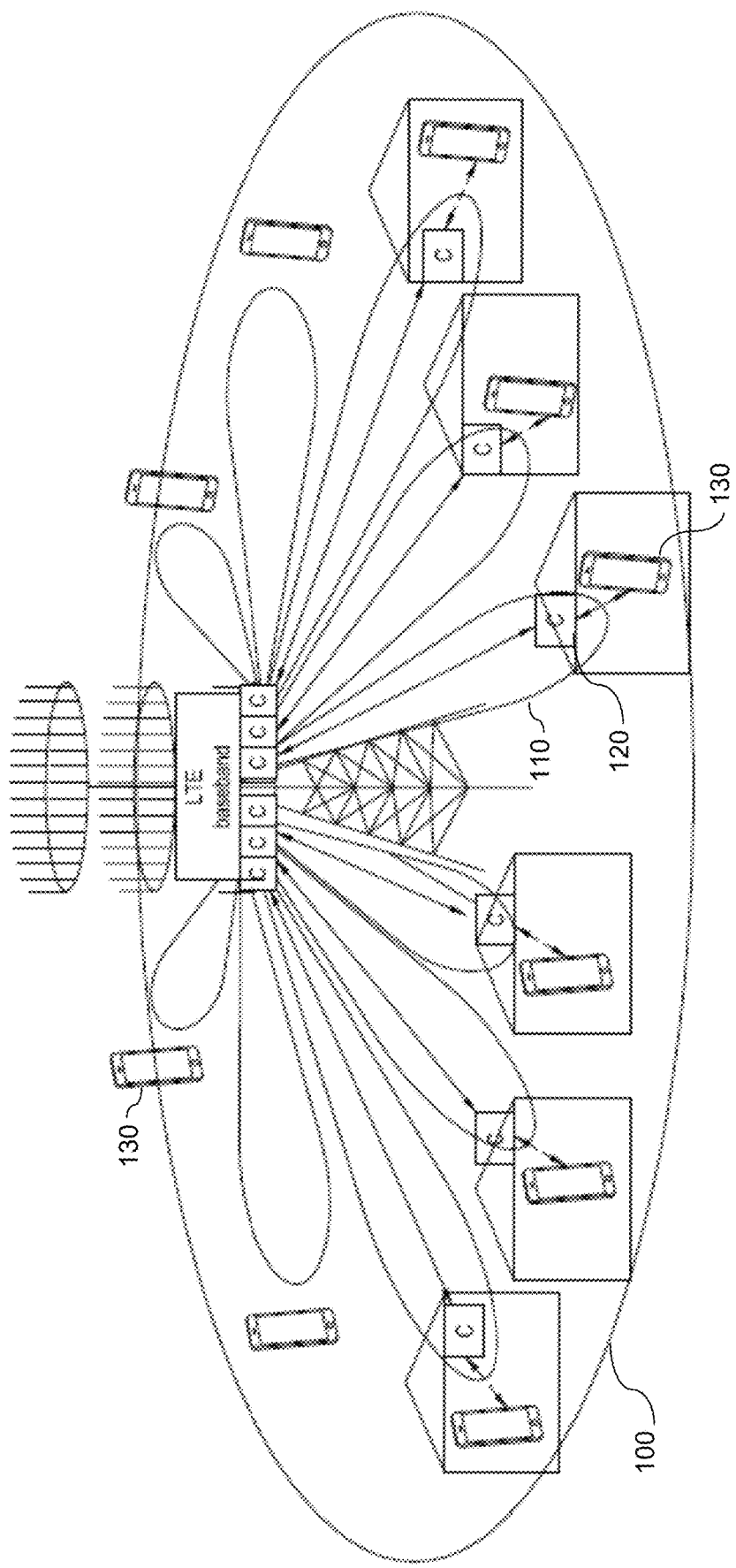
FIG. 1A illustrates a first wireless and wireline architecture implemented within a cell according to various embodiments of the invention.

FIG. 1A illustrates a first cellular and wireline system 100 superimposing the copper twisted-pair line structures on a cellular communications system according to various embodiments of the invention. Some (or all) lines, shown as antenna beams 110, each of which represents a wireline link (shown as "C" for cell), use the copper 120. The wireline links accurately beam-steer the corresponding waveforms until they reach the last wireless link in the customer premises (where additional multiple antennas could be used inside the home for further direction of signals to multiple in-home end points). FIG. 1A shows the end devices as cellphones 130, but they could be any end devices like computers, tablets, televisions, game consoles, things, etc. As long as the copper connection supports enough bandwidth for the home, the entire experience appears as if wirelessly connected on the wireless (e.g., 5G, LTE and/or Wi-Fi) system, a possibly very convenient and efficient form of convergence, at least at the physical layer. For instance, service providers often lament 5G's requisite high capital investment to build more cell sites at a network edge closer to the end users. The proposed 5G-DSL system reduces such cost wherever use of existing copper is prudent. It is important to note that both 5G and DSL are intended to be examples of the physically converged wireless and wireline architectures, respectively. One skilled in the art will recognize that a variety of cellular/wireless protocols may be supported in embodiments of the invention such as WiFi, LTE, Bluetooth, etc. Additionally, a variety of wireline protocols and structures may also be implemented within embodiments of the architectures including DSL, Ethernet, power lines, single coax, fiber and any other type of wire connectivity and/or associated protocol found within a building or providing broadband service to a building.

Embodiments of the invention include infrastructure that uses the existing wires to carry (at low carrier frequency) the wireless baseband signals through base-station-located intermediate-frequency (IF) modulator/demodulator converters. These up/down-convert the baseband unit's (BBU) signals to the appropriate carrier frequency for transmission through the wireline link. In certain embodiments, a duplexing scheme is described for fair/equal sharing of the wireline connection that uses frequency-scaled wireline transfer characteristics to allow time-domain downlink/uplink duplexing. For example, Frequency-Domain-Duplexed (FDD) LTE systems, and even carrier-sense multiple-access (CSMA) Wi-Fi systems, are accommodated with latency well within accepted standards. This frequency scaling also allows fair sharing of the wireline link's bandwidth independent of its length. These systems often can perform as well as the best legacy DSL methods in delivering high individual-residence speeds to end devices. In certain examples, the 5G-IF is connected via the wireline connection to the 5G-RF that up/down converts and frequency scales radio-frequency (RF) signals for transmission through the wireless link. Electrical power that the copper may deliver to the home also can optionally energize the 5G-RF. These converters' architecture avoids expensive home-gateway functionality, otherwise allowing LTE or other wireless deployments to virtualize its functionality inexpensively within the customer premises (and beyond and/or within at least some walls). Alternately, uplink powering through the same copper links is all feasible so that a new-tower location at the northbound copper interface could be powered if no power were available at that new-tower's location. Embodiments also show LTE's MCS can be used to effect near-optimal DSL performance with the wireless signals.

After considering some essential practicalities like synchronization, device association, and maintenance, Wi-Fi systems could be used in the same way with unlicensed bands being used inside the home. This Y5G-DSL architecture places baseband Wi-Fi signals on a copper connection and becomes particularly interesting when viewed with MIMO methods and multipair cabling (Y5G-Ethernet), and with a massive multiple access point system that improves significantly on existing mesh architectures. In principle, one could envision mixed architectures that use 5G-DSL together with Y5G-DSL and/or Y5G-Ethernet. For example, one could use 5G-DSL on outside-plant copper wires to bring high-speed 5G connectivity into the building, and then use Y5G-DSL or Y5G-Ethernet to connect to Wi-Fi-capable devices inside the premises. This could be particularly attractive for enterprise deployments but would also be appropriate for the many homes that today struggle with weak wireless signals and inadequate Wi-Fi coverage.

Embodiments of the invention also include MIMO systems noting that wireless' MU-MIMO signal processing. A number of different situations in bonding of different wireless/wireline paths become possible in various embodiments through exploitation of the wireless MU-MIMO and/or MIMO capabilities. In addition, a higher-performing 5G-RF+ that uses different mid-MIMO precoders may be deployed that allow large performance increases with respect to existing and contemplated practice.

Embodiments of the invention also support wireless massive MIMO system with coordinated distributed antennas that does not require expensive large (high-power) antenna arrays at every cell tower. The existing wires and existing spectra basically create a bandwidth, and consequent bandwidth efficiency, beyond today's most aggressive 5G LTE and/or Wi-Fi realizations.

Figure 1B:
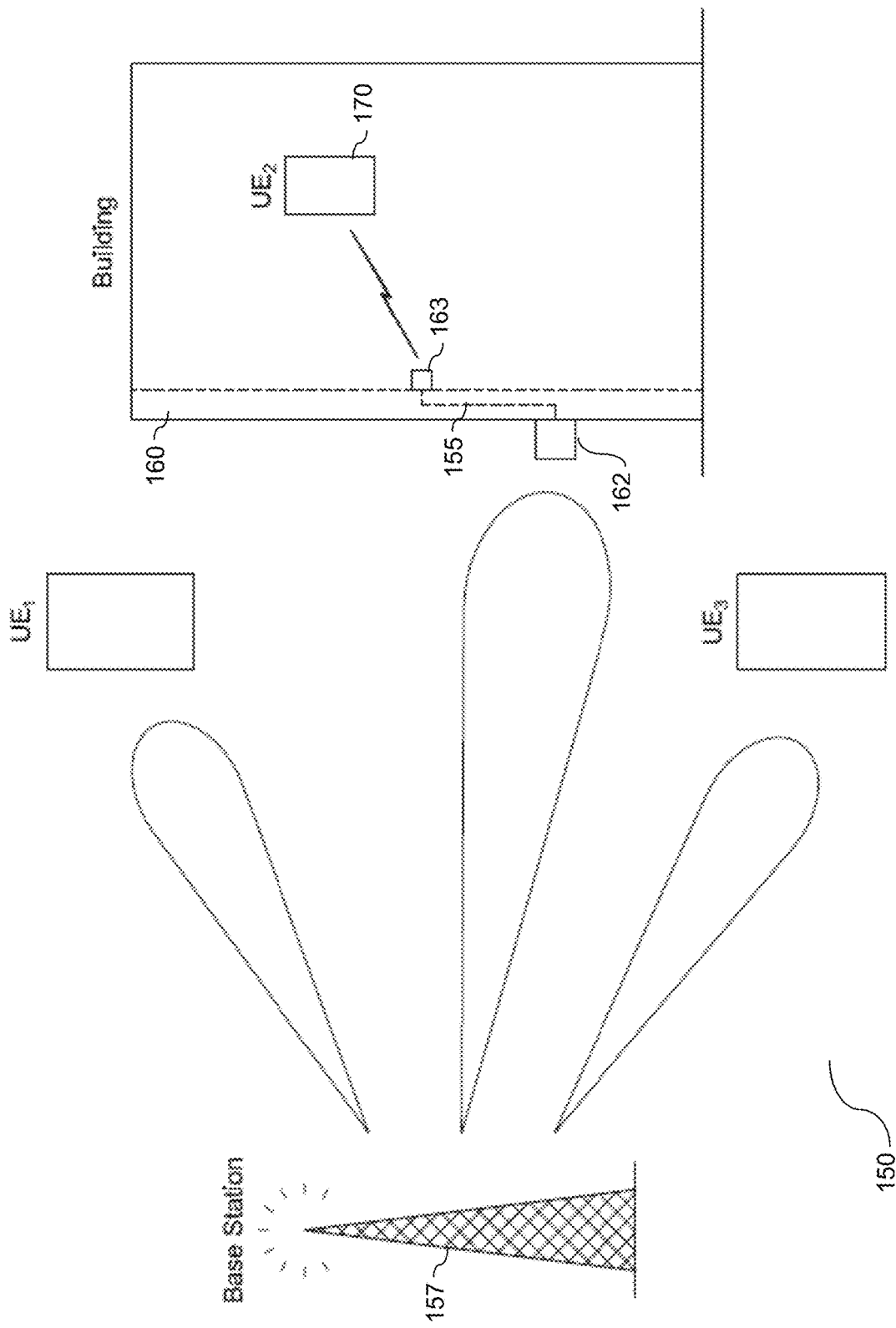
FIG. 1B illustrates a second wireless and wireline architecture implemented within a cell according to various embodiments of the invention.

FIG. 1B illustrates a general architecture 150 in which a wireline portion 155 is used within a wireless channel to traverse a physical barrier 160 (such as a building wall) in order to communicate with user equipment (UE) 170 according to various embodiments of the invention. One skilled in the art will recognize that this architecture will support numerous wireless standards and allow for improved channel quality within the system. As shown, a cellular base station 157 beam forms a signal to a first node 162 (an example of which is described as a "north" transceiver and associated terminology) that converts the signal to allow transmission on copper 155 through the physical barrier 160. A second node 163 (an example of which is described as a "south" transceiver and associated terminology) receives the wireline signal and coverts the signal to allow wireless transmission to the UE 170. Corresponding terminology may also be used for the uplink direction as well. This architecture improves the overall quality of the channel by avoiding a wireless transmission of the signal through the physical barrier 160. Various embodiments of this invention are described below. For clarity, a link is defined as a physical connection, wireline or wireless, used for communication. A channel is a continuous set of frequencies with a bandwidth that is modulated by a carrier frequency. Accordingly, there may be many channels carried on a single link.

5G-DSL (and Y5G-DSL) Base Architectures

Figure 2:
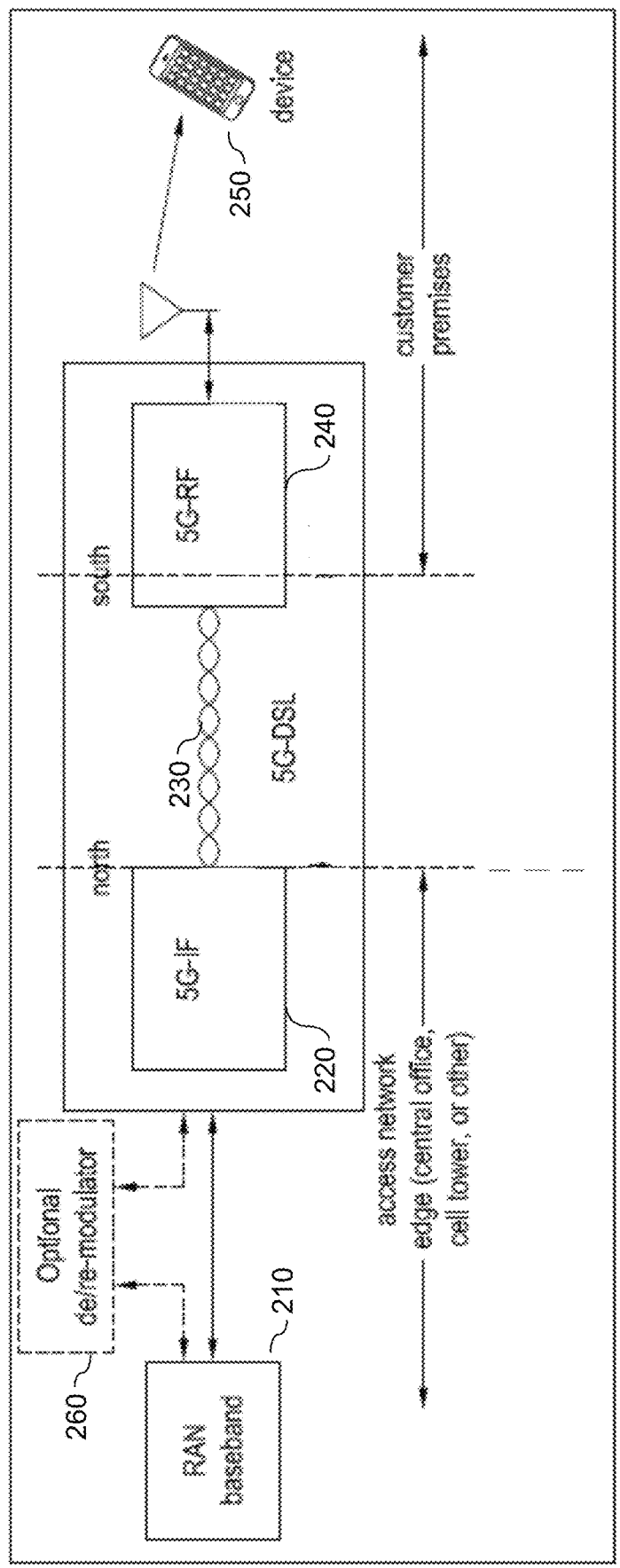
FIG. 2 is a general illustration of a cellular and wireline basic architecture according to various embodiments of the invention.

Embodiments of the invention include a 5G-DSL deployment that is a simple low-cost/low-power RF conversion at the customer's premises. Other embodiments relate to a WiFi-DSL deployment (hence, the "Y" in Y5G-DSL). As stated above, other wireline protocols and structures may be employed instead of DSL. Effectively, this RF conversion completes the radio-access node (RAN) and makes it look as if the entire link is wireless, albeit actually a cascade of wireline and wireless links. FIG. 2's RAN baseband system 210 functionality appears physically at the point where the northbound wireline link terminates (even if that baseband functionality is virtualized in software at another location)

via Common Public Radio Interfaces (CPRI) or other X-Haul methods known to one of skill in the art. The RAN baseband system is not modified with respect to those in use, the 5G-IF 220 accepts the baseband signals prior to RF conversion and translates them for downlink/uplink transmission on FIG. 2's twisted pair 230. Alternatively, for cases where the RAN baseband is not readily available, the 5G-IF is preceded by a downlink demodulator 260 (and uplink re-modulator). This may occur if there is a wireless connection between the existing cell-tower position and the north location of the twisted-pair cables.

FIG. 2's 5G-IF 220 modulates/demodulates (downlink/uplink) the baseband RAN signals to/from convenient wireline-compatible frequencies in accordance with various embodiments of the invention. For example, while FIG. 2 shows the 5G-IF conversion at the north wireline edge that connects to FIG. 2's RAN baseband, various systems could further remove the baseband functionality through a virtualization X-Haul, CPRI, or other alternatives that allow the 5G-IF functionality to couple to the north-end copper position.

As shown, the customer-premises-located 5G-RF conversion system 240 completes the up/down carrier modulation at the south end, effectively implementing a distributed superheterodyne modulator/demodulator across the 5G-IF and 5G-RF system. In certain examples, the 5G-RF system 240 may amplify signals but does no digital decoding nor regeneration of LTE signals. However, certain embodiments of the invention may include additional functionality within the wireline portion to enhance performance further, to reduce costs or to support other parameters within the system.

The channel carrier frequencies (downlink and uplink) may be conveyed to the 5G-RF system 240 through a control channel that runs only on the wireline link and may make use of training signals, one or more control channels, and at least one pilot signal. Embodiments of the invention may also use a wireline channel-sounding procedure that will produce a rough estimate of the signal bandwidth that the wireline link can support, as well as determine the group delay. The wireless 5G-RF signals propagate to/from the wireless end device 250. Wireline filtering and noise distortion become part of a baseband-equivalent cascaded link, which from the system perspective is simply another wireless link. In certain LTE deployments, embodiments of the invention use LTE's inherent capabilities and Modulation Coding System ("MCS") methods. Various other aspects of a variety of embodiments are described below that further supplement the performance of the converged wireline-wireless architectures across different deployments.

G Intermediate Frequency Conversion (5G-IF)

Figure 3:
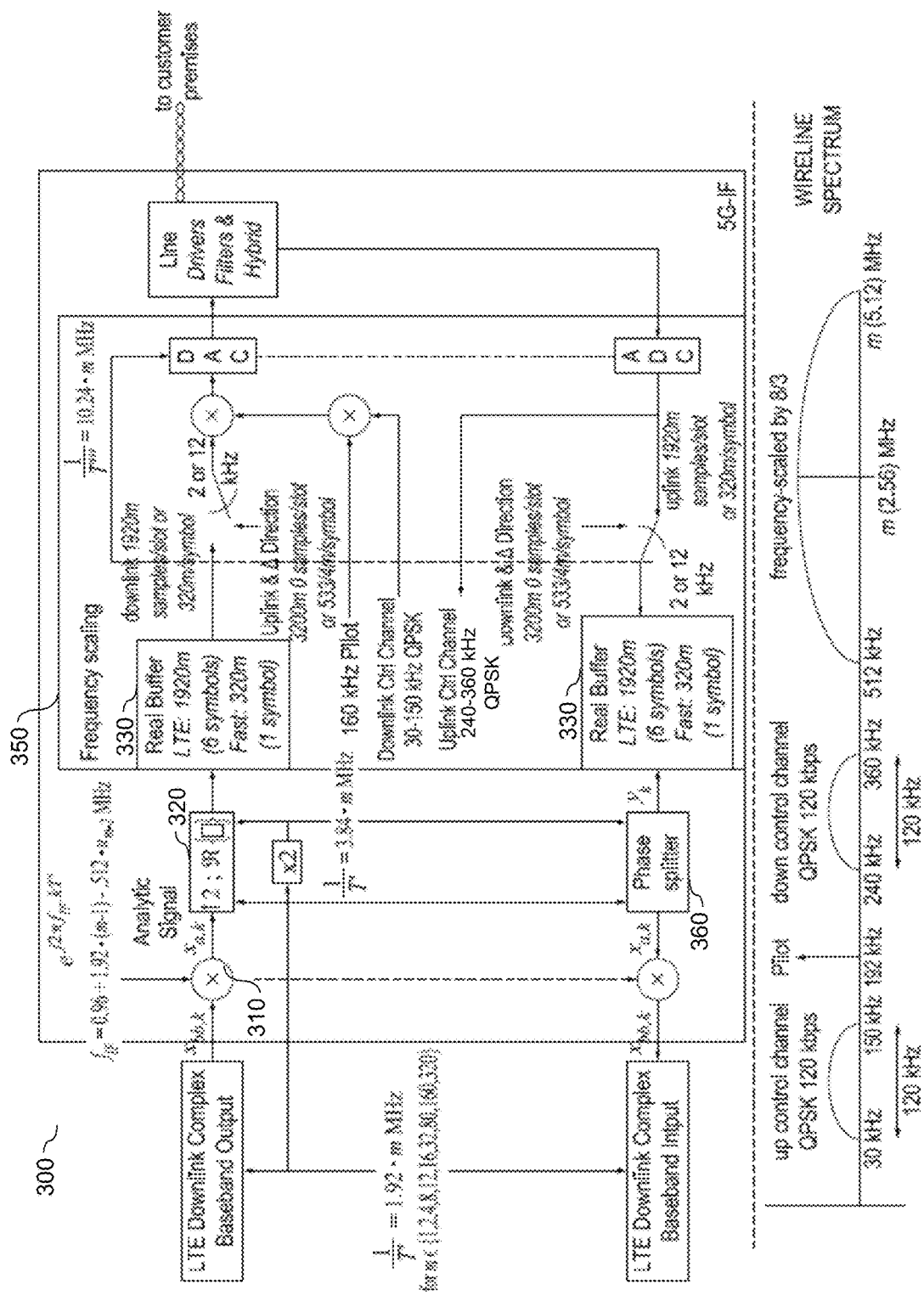
FIG. 3 is a block diagram of a cellular and wireline RAN IF system according to various embodiments of the invention.

FIG. 3 illustrates a network edge radio access node 300 (5G-DSL-RAN), now specifically for LTE's integer index m in accordance with various embodiments of the invention. Note that m=1, 2, 4, 8, 12, 16, 32, 80, 160, 320 in the 5G-NR standard (3GPP, Rev 16). This disclosure will later introduce different subscripted-indexed versions of this bandwidth-expansion/scaling parameter for the wireless system, say $m_{LTE}$ or $m_{Wi-Fi}$, and for the wireline line, say $m_{SG}$ or $m_{YSG}$, and this parameter will generally be a strictly positive integer when used. It may also use the notation $m_{downlink}$ or $m_{uplink}$ where the subscript in all cases helps identify the exact use intended. As noted above, this network edge radio access node 300 may support a variety of wireless/cellular signals as well as different wireline signals/wire structures.

FIG. 3 also provides an exemplary frequency for a system deployment. In this example, the downlink carrier modulation is essentially superheterodyne with the first 5G-IF stage 310 carrier modulating at $f_{IF}$ the LTE baseband signal $x_{bb,k}$ with samples at $$\frac{1}{T'} = 1.92m \text{ MHz},$$

creating a complex LTE analytic signal $x_{A,k}$ at that same sampling rate. The following box 320 interpolates this analytic signal to twice its sampling rate $$\frac{1}{T''} = 3.84 \text{ MHz}$$

and into a real-valued sample stream. The buffer box includes any interpolation-implementation delay. The figure includes both complex signals and real signals as understood by one of skill in the art. In certain embodiments, the remaining superheterodyne's RF carrier modulation occurs in the 5G-RF converter as discussed later within the application.

FIG. 3's complex baseband signal may be present in a base station (such as an LTE base station), taken from a point prior to carrier modulation in a digital form at the sampling rate. If this signal is not readily available, it can be reconstructed by the optional de/re-modulator block shown in FIG. 2. This could imply a wireless connection between the base station and the line-terminal north end of the twisted pair/wireline. In this wireless extra de/re-mod case, the possibility of two wireless versions of the same signal in proximity creates a multi-path situation that certain wireless standards already addresses. It is possible also that a wire (or fiber) could carry the signals between the base station and the line terminal, either baseband (most likely with a copper connection) or as radio-frequency over fiber. These digital time-domain (two-dimensional or complex) samples will recycle in time index, so $x_{bb,k}$ k=0, . . . , (160·m−1) includes a cyclic extension of 32·m repeated samples $x_{bb,k}$= $x_{bb,k-128m}$; k=128m, . . . , 160m−1 for each symbol.

This format of extra 25% cyclic extension is known at the LTE-long format but one skilled in the art will understand that other formats are supported by various embodiments of the invention. In this particular LTE example, these signals mathematically correspond to 128m 15-kHz-wide tones, where the upper and lower (roughly 10%) edge tones are not excited by standardized LTE (to leave wireless channel frequency guard bands of at least 192m kHz above and below the LTE signal). The (long-format) LTE symbol rate is $$\frac{1}{T} = 12 \text{ kHz}.$$

One simple way that a 5G-IF might interpolate repeats LTE's pre-DFT baseband LTE signal in frequency, zeroes the upper image, and then translates the remaining signal up by ½ the size of the FFT, although this may require a DFT to time domain to occur in the interpolation box before taking the real part at the new doubled sampling rate. Any downlink delay in causal interpolation can be reduced from the ensuing time-domain buffer's symbol/slot boundary. The 5G-DSL IF carrier-multiplied analytic signal will leave (at least when m=1 and more otherwise) 192 kHz of empty bandwidth from 0-192 kHz (and a similar amount zeroed at the highest frequencies of the IF output up to 1.92m MHz. Effectively, the IF modulation re-centers this baseband complex signal to an analytic complex signal centered at $f_{IF}$, whose real part will be conveyed over the channel after undergoing a new frequency scaling in accordance with various embodiments of the invention.

As shown in FIG. 3, a buffer 330 time-duplexes downlink and uplink signals into the single wireline link. Each baseband slot contains a certain number of symbols (e.g., for LTE, 6 successive symbols or 960m samples (in 500 μs) that corresponds to a 2-kHz clock). These samples are converted in succession to analog at the higher sampling rate of $$\frac{1}{T'''} = 10.24 \text{ MHz}$$

(⅓ of the LTE master clock frequency of 30.72 MHz).

The frequency-scaling box 350 bursts samples into the channel and effectively spreads the frequency response downlink (and de-spreads it uplink). The 5G-IF may operate in multiple modes including embodiments in which two 5G-IF operational modes are provided as shown in FIG. 3. The fast-buffer mode has lower latency and duplexes by changing direction every symbol. The LTE-latency mode adds a slot having a pre-determined delay (a slot time). Either may be acceptable, but the fast mode is shown to allay any concerns about the 5G-DSL system's added latency. The fast mode adds extra zeroed samples to each symbol to allow symbol-by-symbol direction reversal from downlink to uplink. One skilled in the art will recognize that FIG. 3 illustrates one embodiment of these modes. In one example, these zero samples may occur before and after any symbol so amount to a zero period of either 533 or 534 zero samples inserted when a specific direction (up or down) is silent, as shown in FIG. 3. The silent periods offer the opportunity for the 5G-IF downlink (and 5G-RF uplink) to increase the cyclic-prefix length on the wireline segment. Such an increase can improve performance on the wireline link. It can also be used to create a timing advance A of the signal that is equal to the negative of the group delay measured, which will be described in more detail below. This may be done implicitly within the 5G-DSL system without the need to adjust the exterior LTE system timing. Such a method generally could be used in many distributed-antenna-system (DAS) applications with wires and not just 5G-DSL, as long as the wireline section between baseband processing and antenna supports roughly the same bandwidth as the twisted pair described here (which is highly likely as wires used in distributed antennas are likely to be higher grade than twisted pair).

In an exemplary LTE deployment, the uplink may use a single-carrier OFDM, which is simply an OFDM-synchronized signal that corresponds to a particular uplink user's tones being aggregated as a wider single-carrier, but with effectively the same sampling rate. This uplink signal will aggregate $N_{uplink}$ uplink tones' input symbols into a single time-domain sampled sequence with these $N_{uplink}$ baseband input uplink symbols in succession, and then add same-OFDM-length cyclic prefix added to this set of $N_{uplink}$ signals. The OFDM symbol boundaries are thus maintained. This may involve compensation for group delay of the wireline segment as mentioned above. This action reduces peak-to-average power for uplink transmitters where battery energy consumption my often be an issue. Because of the constant OFDM structure used in terms of time-domain samples, this uplink format may not cause changes to the 5G-IF (nor 5G-RF) systems described herein.

In an exemplary LTE-latency mode, the 5G-IF buffer inserts an extra 1280m zero samples that allow direction reversal (so that transients must abate in 640m samples for each reversal of transmission down-to-up and up-to-down). These particular numbers (for both fast and LTE modes) allow the 192 kHz pilot to be both a simple integer divisor of the 30.72 MHz master clock and also to be placed in a passband of a copper twisted-pair channel. Another pilot-frequency choice could be 384 kHz (although this may be less ideal on some heavily distorted transmission links) and consequently place both up and down control channels below this alternative pilot (perhaps moving the down control from 180 kHz to 300 kHz). Both LTE and fast modes also easily allow asymmetry to be proportionately introduced without concern for spectrum planning. This buffering accommodates any asymmetry from 12:0 (broadcast LTE) to 0:12 (all upstream); for instance, 8 symbols downlink for every 4 uplink would provide a 2:1 asymmetry ratio in the format, while 9 symbols downlink for every 3 uplink would be 3:1 asymmetry and 10/2 would allow 5:1 asymmetry. These would be the corresponding ratios of the 5G-DSL system's choices of $m_{downlink}/m_{uplink}$ with some additional loss of one direction's bandwidth; almost any value of $m_{downlink}/m_{uplink}$ and thus any asymmetry ratio could be accommodated. One skilled in the art will recognize that the specific embodiment is intended to be an example deployment and that various other implementations fall within the scope of the invention.

The frequency scaling allows wireline filtering distortion to be shared equally by downlink and uplink signals regardless of the wireline-copper link's length. The frequency scaling may be removed at the 5G-RF as described later and thus may occur only on the wireline link. A smaller number of samples could also be used for direction reversal; for example, because LTE transients typically abate in 32m (complex) time samples. These silent samples may simplify timing recovery, and/or indeed allow for optional extra (non-LTE) services to the customer. As mentioned earlier, samples from this buffer of silent samples may be deleted to create a timing advance that compensates for the measured wireline group delay. The re-use of extra samples' bandwidth also provides an opportunity to service providers who may have multiple objectives for their infrastructure build and consequent capital-expense allocation to support various services and applications as discussed later. Consequently, the real-signal downlink DAC may run at twice the corresponding real signal's highest frequency of 3.84 MHz increased by 4/3 or at 10.24m MHz, as in FIG. 3. In effect, the LTE's signal bandwidth for either direction is frequency scaled by oversampling (by 8/3 its original bandwidth when entering the IF) when that direction is active. This system remains linear in its baseband-equivalent effect. The channel filtering will be the product of the frequency-scaled copper-link transform and the following (non-frequency-scaled) wireless-link transform for the overall baseband equivalent channel transfer.

As shown in FIG. 3, the uplink path has similar functionality that corresponds to the reversed direction. An uplink phase-splitter delay 360 (in causally implementing analytic signal $y_A(t)=[y(t)+j\cdot\dot{y}(t)|_{t=kT''}])$ may be offset from the nominal symbol/slot boundary in the preceding time buffer where $\dot{y}(t)$ denotes Hilbert Transform. Embodiments associated with FIG. 3 also provide the scaled wireline-only signals' frequency range (downlink and uplink) from 512 kHz to the highest frequencies, and then the pilot and control channel.

5G-Radio-Frequency Conversion System (5G-RF) at the Customer Premises

Figure 4:
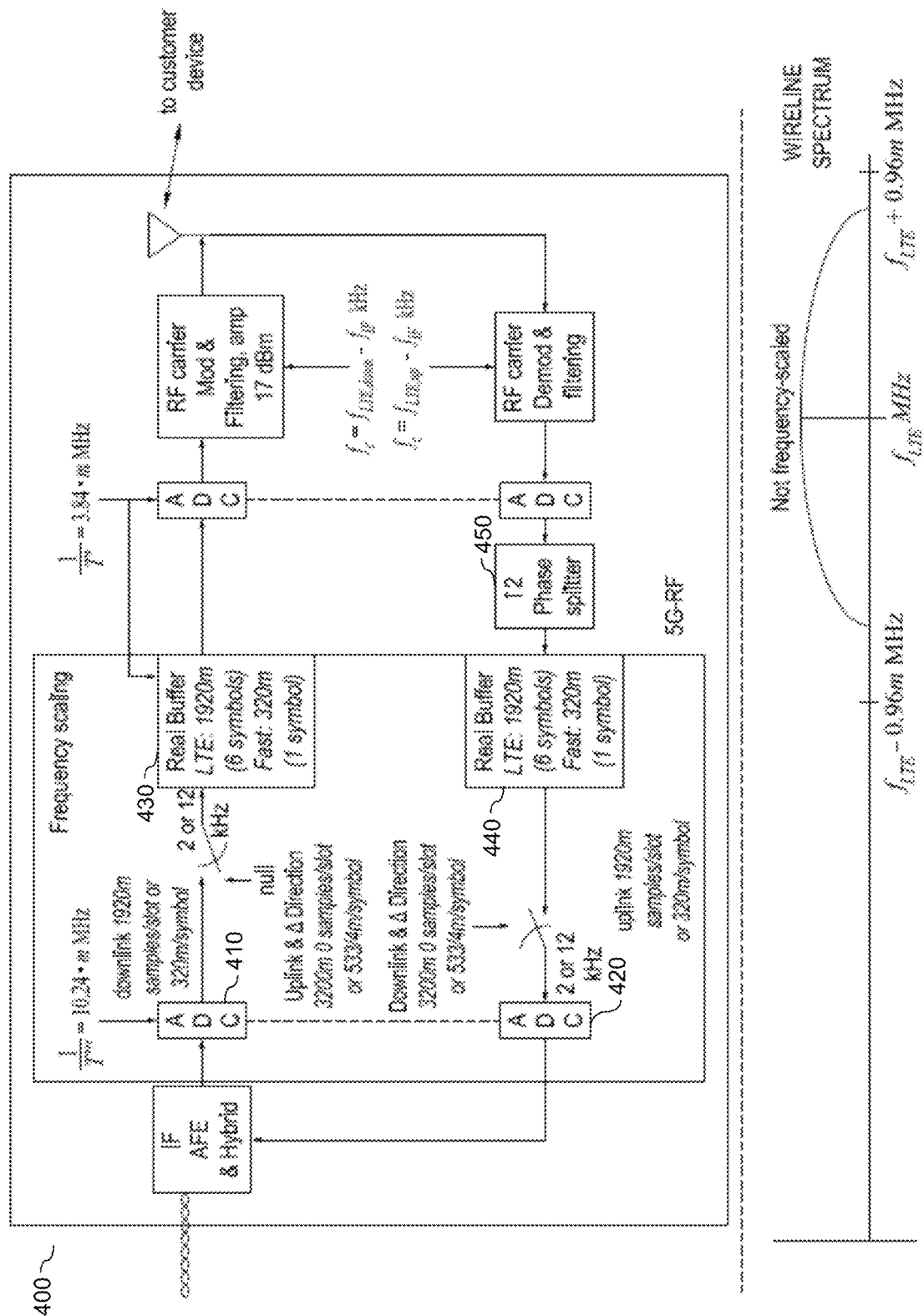
FIG. 4 is an exemplary block diagram of a cellular and wireline system at a customer premise according to various embodiments of the invention.

FIG. 4 illustrates the customer-premises-located 5G-RF system 400 between the wireline and wireless links according to various embodiments of the invention. In this example, the ADC 410 and DAC 420 are both presumed synchronized to the 5G-IF's $$\frac{1}{T'''} = 10.24m \text{ MHz}$$

sampling rate described above (and indeed also implied thereof at symbol boundaries as well). The nonzero downlink samples (with distortion introduced by the wireline link) are gated into the buffer 430 by the same LTE 2-kHz slot clock. The slot clock (and thus symbol clock) boundaries may be advanced by the measured group delay A of the wireline link. There may be an additional maximum delay of less than 42 μs (fast mode) or 500 μs (LTE mode) in the 5G-RF in the example described above.

When the direction is reversed or during uplink transmission, the downlink buffer is neither filled nor emptied. When the downlink is active, the output non-zero real samples will be regularly spaced at 3.84m MHz and will be converted at that continuing rate into analog by the DAC 420 before (continuous-time) modulation to the selected channel carrier frequency of $f_{c,down} = f_{LTE,down} - f_{IF}$. This operation removes the downlink wireline link's frequency scaling prior to wireless transmission downlink. The downlink (and uplink) carrier frequencies may be communicated to the 5G-RF system through the control channel. The wireline time-domain duplexing will have disappeared at this RF modulation point, and any frequency-scaled equivalent transfer/filtering of the downlink wireline channel will now be embedded in the link as if it were just another element of the wireless baseband-equivalent link.

Referring to embodiments in FIG. 4, the uplink path is the corresponding uplink frequency-scaling functionality that samples the demodulated uplink wireless signal at 3.84m MHz and then interpolates by a factor of 2 with an analytic signal phase splitter before buffering for uplink wireline transmission in the non-zero uplink sample periods of the 2-kHz LTE slot clock (or 12 kHz symbol clock in fast mode). Any phase-splitter implementation delay is reduced from the buffer offset relative to the symbol-time start. In effect, this means the phase-splitter 450 can be combined with the buffer 440. The nonzero samples (e.g., 1920m LTE mode, and 320m in fast mode) will correspond to the uplink slot, while the remaining samples (e.g., 3200m in LTE mode, and 533/4 in fast mode) are the zeros for direction reversal and downlink transmission on the single wireline channel uplink. Again, the aggregate transfer function will be the product of the frequency-scaled uplink wireline baseband-equivalent transfer function and the baseband equivalent of the carrier modulated wireless uplink as described in more detail below. The excess of samples again can be optionally used to support extra (non-LTE) services.

Control, Synchronization, and Sounding

The 5G-RF system may perform initialization, synchronization, and updating. It may also perform some basic maintenance capabilities for fault location. Exemplary embodiments incorporating this functionality are provided below.

Pilot Signal

Embodiments set forth in FIG. 3 show a $$\frac{1}{T_{pilot}} = 192 \text{ kHz}$$

pilot that continuously transmits downlink during all operation. As mentioned earlier, this is an exemplary placement of the pilot on a twisted-pair link. This 192 kHz pilot is derived from a Master Clock (e.g., LTE Master Clock running at $$\frac{1}{T_0} = 30.72 \text{ MHz}$$

or optionally $$\frac{1}{T'_0} = 245.76 \text{ MHz}$$

for wider bandwidths, or even just optionally $$\frac{m}{T_0} = 30.72m \text{ MHz}$$

for exceptionally wideband systems if needed). This exemplary pilot has $p_{pilot} = 96$ cycles per 2-kHz slot-clock period $T_{slot}$ (12-KHz and 6 cycles for fast mode), and thus 16 per symbol (2⅔ for fast mode, which leads to the 106—for ⅓ of symbols or 107 for ⅔ of symbols—samples and 534 zeros for 1/3 or symbols or 533 zeros for 2/3 of symbols inserted in FIG. 3), which both may be counted with upward zero-crossing aligned with the start of each slot clock period of 500 μs. For this particular example, all sampling and symbol clocks are integer divisors of the master clock (except for the carriers, which are rational multipliers of the master clock) as shown in Table 1.

TABLE 1

| Clock dividers | | | |
| --- | --- | --- | --- |
| Clock | Divider p | Variable name | Nominal Frequency |
| Master LTE Clock | 1 | $T_0$ | 30.72m MHz |
| Slot clock | $p_{slot} = 15,036m$ | $T_{slot}$ | 2 kHz |
| Symbol clock (fast slot clock) | $p = 2,560m$ | T | 12 kHz |
| BB LTE sample clock | $p' = 16$ | T' | 1.92m MHz |
| Analytic LTE sample clock | $p'' = 8$ | T'' | 3.84m MHz |
| 5G-DSL sample clock | $p''' = 3$ | T''' | 10.24m MHz |
| pilot | $p_{pilot} = 96$ | $T_{pilot}$ | 192 kHz |
| 5G-IF carrier | $p_{IF} = 32$ | $T_{IF}$ | 960m kHz |
| carrier | $\left(\frac{n}{p_{slot}}\right) \cdot 2$ kHz | $T_{RF}$ | n 2 kHz |

The IF carrier frequency as well as the RF carrier frequency may also be locked to rational-fraction multiples of this pilot or integer multiples of the slot clock (e.g., as required by LTE) by phase-locking to a voltage-controlled crystal oscillator (VCXO) at the master clock frequency. The 5G-RF system also generates $$\frac{1}{T''}$$

and the carrier frequency. For wider bandwidth (such as an LTE deployment), the easiest clocking solution may be to scale the VCXO crystal to a multiple of the master clock frequency with m=320 for the widest LTE bandwidth of 400 MHz (which is unlikely to be used on wireline links), which may use a crystal at 9.8304 GHz.

In the case of LTE, the higher master clock of 245.76 MHz (which allows up to m=8 or 10-MHz-wide LTE channels to be served) is used. With the 5G-IF's frequency scaling, a 10 MHz LTE channel will consume 26.7 MHz of wireline-link bandwidth with time-duplexing enabled (keep in mind all DSL systems also lose bandwidth for duplexing that exceeds a factor of 2 for symmetric transmission). Such 26.7 MHz bandwidth might well be representative of a wireline link with length less than or equal to 1 km. Shorter lengths would encourage higher frequency local VCXO-based crystals in the 5G-RF, which would still be driven by the phase error measured at the nominal pilot's zero crossings (that is divided by a counter with value P, from the master clock). At the 5G-DSL sampling rate, these samples occur every 32 (or really 64 if both the pilot's positive and negative slope crossings are used with simple alternating sign) samples.

Figure 5:
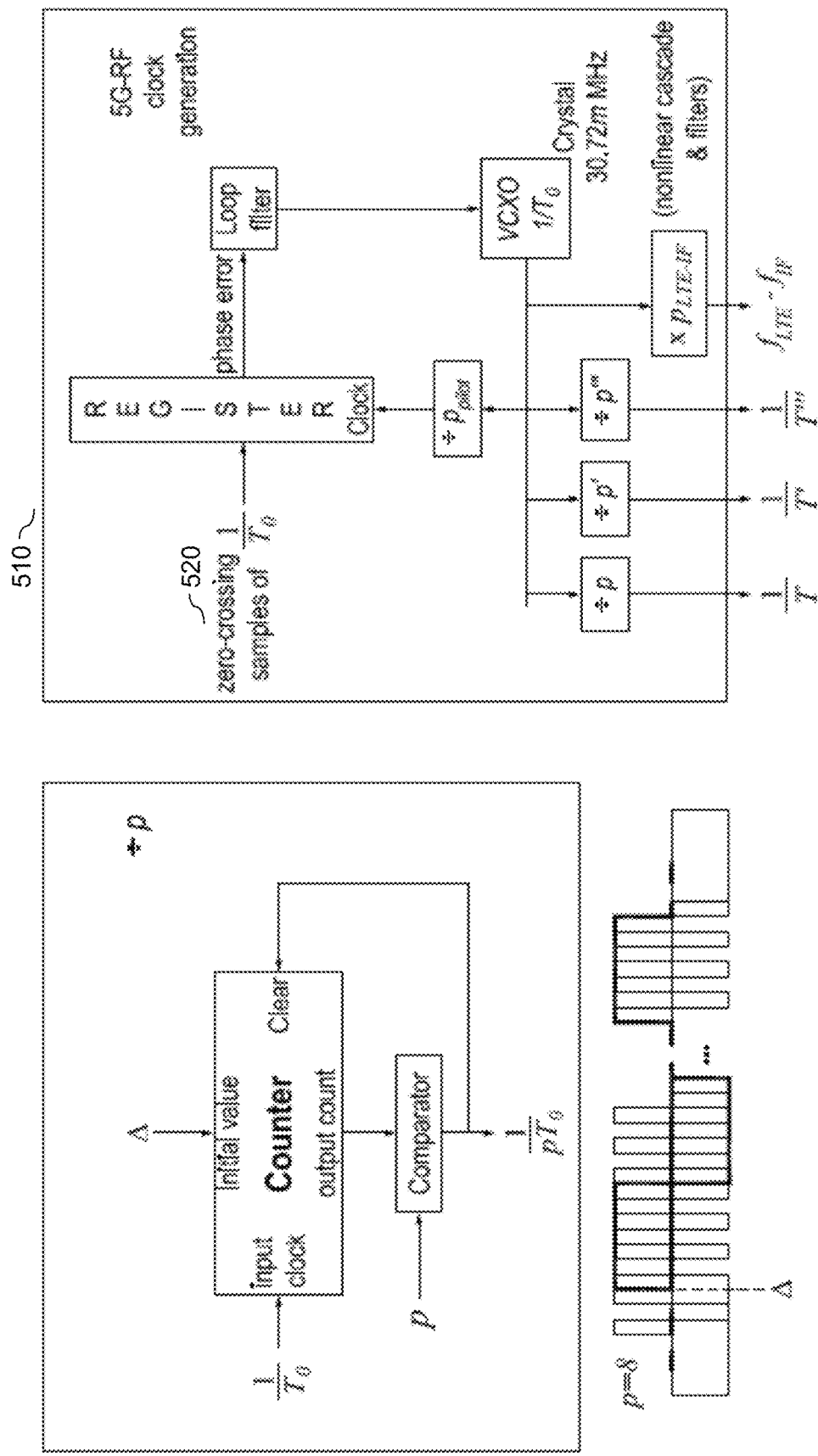
FIG. 5 illustrates an architecture for a cellular and wireline general clock synchronization according to various embodiments of the invention.

FIG. 5 illustrates clock generation 510 from the pilot in accordance with various embodiments of the present invention. Table 1 shows that clocks are related and implies positive-slope zero crossings 520 aligned with the slowest slot clock's positive-slope zero crossing. The high-frequency carriers will require synthesis from the master with local nonlinear frequency-multiplication circuitry, now at the 5G-RF, as also shown in FIG. 5. The offset A in FIG. 5 is the negative of the group delay in clock periods of the master clock. In certain embodiments, it may also be deleted from the preceding buffers in the 5G-IF downlink and 5G-RF uplink.

In certain examples, the PLL may phase-lock to within 1 microsecond accuracy on the symbol clock. In the case of LTE, the pilot will have at least 40 dB SNR on any usable wireline link, which may include phase jitter caused by fixed-line noise (and there is otherwise no source of jitter on the wireline segment, because there is no doppler nor carrier offset). This 40 dB corresponds to a 25 ns phase-jitter standard deviation at 384 kHz (384 kHz is double the pilot's 192 kHz, but both pilot zero crossings can be used for phase-error generation with alternating sign applied). The symbol clock is 12 kHz and the fixed-line jitter offset is well below the LTE requirement of roughly 1 microsecond. Thus, the pilot itself readily maintains the clock accuracy for the symbol synchronization.

In the case of LTE embodiments, the various standards require recovery from Doppler shifts corresponding to a vehicle speed of up to 200 km/h (approximately 124 mph). For a 60 GHz carrier, this is roughly 10 kHz, and thus 1 kHz at 6 GHz, 100 Hz at 600 MHz where 10 kHz corresponds to a period of 100 microseconds. The carrier ratio to the pilot frequency is roughly 160,000 (64 GHz/384 kHz), which means that the 384 kHz jitter standard deviation needs to be 0.50 ns or a factor of roughly 50 below the pilot jitter. This implies averaging of $50^2$=2500 phase-error samples. With 384,000 pilot zero crossings per second, the PLL loop bandwidth need only be about 150 Hz (so 6 ms recovery/training times for the PLL). The simple pilot system will have any frequency-offset/jitter dominated by the LTE wireless-link jitter and frequency offset, which the LTE design and specifications already accommodate.

Channel Sounding and Group-Delay Offset Estimation

In looking at an exemplary LTE deployment, the standard requires roughly 1 μs accuracy in base-station symbol start between different base stations. This requires a common clock source (sometimes a GPS clock, or more often a common network clock) and accurate measurement of the delay from that clock source to the wireless transmission point. The 5G-RF moves the antenna point relative to the LTE baseband signal, and so the group delay through the wireline link must be accurately estimated and then added to the amount already estimated by LTE. Typically, the LTE system itself has an ability to handle differential delays between the network clock and various physically distinct antenna locations. However, certain LTE systems will not accommodate for delays of the wireline segment automatically. Sometimes field installation technicians will know the length of wire and manually adjust the offset for an installation if it is needed. However, the 5G-DSL system will inherently offset this delay by effectively deleting samples from the cyclic prefix to make it appear as if the signal were advanced by the negative of the group delay. This essentially occurs in the buffers of the 5G-IF downlink and 5G-RF uplink. The 5G-DSL system estimates this group delay as in this section. This process is also used in general for LTE systems that employ distributed/coordinated antennas, and each of those systems must estimate delay from a common network clock source all of which fall within the scope of the present invention.

Because of the wireline link's time-domain use, the roundtrip delay can be measured from the 5G-IF downlink input to the 5G-RF and back to the 5G-IF uplink output (and then divided by 2). Such a measurement is feasible in the wireline link through what is known as loop back. As shown in FIG. 4, the signals before the final downlink DAC and after the uplink ADC are connected during loop back (smaller downlink/uplink delay asymmetry will be handled by the buffer index A on the count-downs of a master clock). The 5G-RF will perform loop back (and in the case of LTE, is not enabled nor passed) and transmit a known symbol L times. A recommended symbol would be the chirp signal $$X_{bb,n}^0 = \frac{1}{\sqrt{128m}} \cdot e^{j\frac{2\pi}{128m}n(n-1)},$$

with n as the frequency/tone index, but the channel's edge tones are zeroed. This signal has constant amplitude on used tones and known phase. It can be precomputed and stored for use in sounding. One skilled in the art will recognize that other signals are possible in accordance with various embodiments of the invention. In certain LTE examples, this signal uses the same cyclic extension as LTE and the loop back of the chirp signal is performed after synchronization to the 192 kHz pilot has already been achieved. (Continued phase lock is possible by sending the pilot continuously during loop back. Simple measurement of the pilot delay, however, is not sufficient because it is not in the 5G-DSL signal's pass band, but $X_{bb,n}^0$ is in that passband.) The controller-stored signal is looped-back to the uplink LTE where the 5G-IF will capture and store it, then likely compute DFTs (which need not be real-time) of that stored signal. The DFT output for each used frequency can be divided by the known DFT value for the fixed training (chirp) sequence. This estimate of the channel transfer is then averaged over all L symbols. In certain example, the channel output for tone n of training symbol l is $$E[\hat{H}_n] = H_n \qquad (1)$$

$$Y_{n,l} = H_n \cdot X_{bb,n}^0 + N_{n,l} \forall l-1, \ldots, L_0.\qquad (2)$$

The channel gains $H_n$ can be estimated by (the inverse need not be stored when the sounding signal has constant and thus known amplitude)

$$\hat{H}_n = \frac{1}{L_0} \cdot \sum_{l=1}^{L_0} \frac{Y_{n,l}}{X_{bb,n}^0} = H_n + \frac{1}{L_0} \cdot \sum_{l=1}^{L_0} \frac{N_{n,l}}{|X_{bb,n}^0| \cdot e^{j\theta_n^0}}. \qquad (3)$$

The expected value of the estimate is equal to the channel because the noise is zero mean, so $$E[\hat{H}_n] = H_n, \qquad (4)$$

an unbiased estimate. The variance of the estimate is easily computed from the noise energy per (complex) dimension $\sigma_n^2$ as $$\text{var}(\hat{H}_n) = \frac{1}{L_0} \cdot \sigma_n^2. \qquad (5)$$

Thus, the channel gain estimate improves linearly with the number of repeated training signals. This accuracy will already be very good for most diagnostic purposes with $L_0 = 10\text{-}20$ symbols. For delay estimation, the phase may be further analyzed. Presuming such large values of $L_0$, the ratio becomes $$\frac{H_n}{\hat{H}_n} = e^{j(\theta_n - \hat{\theta}_n)} = e^{j\delta}, \qquad (6)$$

where $\delta$ is a small phase error in the estimate (the tone index is dropped here, presuming this error is small and essentially random over all the tones). Using the approximation $e^x = 1 + x$ for small x, the phase-error variance, or the jitter, also decays linearly with the training period (once converged for amplitude). This means the phase-jitter standard deviation decays with the square root of the number of training samples.

The phase over the used tones can be subtracted from adjacent tones, and the slope estimated. That is $$\text{delay} = -\text{slope} \cong \frac{1}{\bar{N} \cdot L_0} \sum_{l=1}^{L_0} \sum_{n=N_1}^{N_1+\bar{N}-1} \frac{\hat{\theta}_{n+1} - \hat{\theta}_n}{2\pi(15\text{ kHz})}. \qquad (7)$$

The variance of the noise in the phase estimates in the numerator of (7) is double the jitter estimate, but otherwise the variance in the slope estimate also decays linearly with the square-root of the number of training symbols and used tones. A 12 kHz clock has a period of roughly 86 s. In an LTE deployment, this needs to be reduced by a factor of 100 to meet the 1 µs LTE specification, which means (since $\bar{N} \geq 100$) that $L_0 = 100$ will suffice. In certain embodiments, the group delay can also be occasionally updated using an inserted chirp signal (or other known training sequence) in the middle 320m samples of the 640m-sample silent period. For example, in fast mode, a shorter symbol of length 64m+16m=80m can be inserted in the middle of the extra 106/7m zero periods and be used for updating. This need not occur on every slot (1/10 of the slots would readily suffice).

This group delay is the round-trip group delay, and thus doubles the estimated value. The same formula in Equation (3) can be applied downlink by the 5G-RF control processor in that device on the signal before loop back and will be the downlink group-delay estimate. The uplink group-delay estimate will be the difference. In certain implementations, the differences may cause these two to be unequal. The 5G-RF communicates its downlink group delay over the control channel to the 5G-IF, which then computes the difference, relative to the round-trip delay over 2 (half) when such adjustment is used, which in certain embodiments may be computed in samples of the buffer clock period T. If the downlink group delay is longer than the half-round-trip delay, this amount is subtracted from the Δ value for the T''' counter (modulo p'''); correspondingly if the delay is shorter, this is added to Δ. This process fine tunes the 5G-RF's symbol emission times to be well aligned with other LTE RAN's emissions.

TABLE 2

LTE channel bandwidth's corresponding wireline lengths

| LTE Channelization (MHz) | Scaled Bandwidth | Max twisted-pair length |
|---|---|---|
| 1 | 500 kHz-5 MHz | 2 km |
| 3 | 500 kHz-12 MHz | 1.5 km |
| 5 | 500 kHz-25 MHz | 1 km |
| 10 | 500 kHz-50 MHz | 500 meters |
| 20 | 500 kHz-125 MHz | 200 meters |
| 100 | 500 kHz-625 MHz | 100 meters |
| 200 | 500 kHz-1250 MHz | 50 meters |
| 400 | 500 kHz-2500 MHz | 20 meters |

In the case of LTE, a wireline link of less than 2 km will generally support at least the lowest channelization of LTE, which when frequency scaled is 5 MHz wide. Shorter lengths will support wider LTE channelization up to 100 MHz. Table 2 illustrates the match of LTE Channelization to twisted pair lengths and the suggested rough band of transmission. Table 2 presumes that all crosstalking systems in the same binder of twisted pairs are using the same 5G-DSL system clock. The need for legacy xDSL spectral compatibility is presumed negligible in systems that would attempt to transition to 5G-DSL as a new cell is deployed within a neighborhood. However, as previously noted, it is possible to burst-mode align 5G-DSL transmissions with G.fast's directional TDD bursts, particularly taking advantage of the many zero samples associated with frequency-scaling. A VDSL spectrum mask could be applied to the 5G-IF downlink and 5G-RF uplink transmissions to reduce crosstalk, and this would appear to LTE as severe spectral fading, necessitating an MCS selection with heavy redundancy in code and small constellation size.

A base station or Wi-Fi access point may want to know the possible channelization and the converter box will need to know the carrier frequency, or equivalently what is the maximum value of m that can be used. The same process used for delay estimation will also provide an indication of channel gain/attenuation across the band of the $X_{bb,n}^0$. Channel sounding to determine the maximum possible usable bandwidth would simply attempt successive values of m or indeed can simply inspect the channel transfer magnitudes, and may be executed by the control processor at the 5G-RF on the downlink sounding sequence $X_{bb,n}^0$. The 5G-RF-located measurement provides the wireline link's channel transfer. In certain LTE deployments, the LTE receiver designer (who will know their own error-decoding/erasure algorithms) may allow for recovery of at least 25% of the Coded-OFDM tones to be recovered with at least one of the allowed MCS options. Thus, this simple rule would lead to a 5G-IF rule that any band corresponding to a value of m that has more than 25% of its active tones reporting an energy level below −100 dBm/Hz should not be used. The −100 dBm/Hz corresponds to a level at which the wireline link would have an SNR that may begin to limit performance (even though such a signal and the associated wireline noise would be amplified before transmission from the 5G-RF).

Maintenance and the Control Channel

FIG. 3 suggests a minimal control channel using simple modulation (BPSK with redundancy) below 500 kHz in accordance with various embodiments of the invention. Data rates of 120 kbps are readily feasible with high reliability to pass control information to/from the converter and the base station. Further redundancy and acknowledgement with repetition might also be considered on various commands. In certain embodiments, the control channel will perform one or more of the following basic functions:

1. place the converter in sounding mode;
2. set the uplink and downlink carrier frequency values for the converter to wireless interface;
3. initialization; and
4. various maintenance/diagnostic functions for the line channel.

Control channel signals can also be used to facilitate cloud management as discussed in more detail later within the application.

Performance of the 5G-DSL Wireline Link

The MCS (modulation and coding system) may be used in various embodiments of the invention to adapt data rate and coding parameters to the severity of channel distortion. In LTE deployments, the resource allocation has a resolution of 12-tone resource blocks that are each 180 kHz wide. These blocks also span 1 ms time slots or equivalently 12 successive symbols. Such LTE resource blocks can be energized (carry data) or are not used (zeroed in energy). The resource blocks are successive in frequency over an LTE system's channel range. By comparison, G.fast systems today use 51.75-kHz-wide tones, or resource blocks, that also can be selectively energized or zeroed. G.mgfast systems have an option to use instead 207-kHz-wide tones, so G.mgfast has a lower frequency resolution than LTE's 180 kHz. The loading system for G.fast allows constellations from 4 QAM to 4096 QAM, while LTE allows the same (although only for even integer numbers of bits/tone) within each resource block. LTE's bit-interleaved punctured convolutional ("LDPC") options are sufficiently flexible to allow the same coding power as is offered by G.fast's interleaved combination of 16-state four-dimensional trellis codes with outer Reed Solomon. One skilled in the art will recognize that MCS techniques may be applied to other embodiments of the invention other than LTE and G.fast.

An important concept in physical-layer transmission on any medium is the relationship of achievable data rate b in bits per complex dimension with signal-to-noise ratio (SNR)

$$b=\log_2(1+SNR/\Gamma). \tag{8}$$

One skilled in the art will understand that the gap parameter $\Gamma \geq 1$ is used for practical systems to reduce data rate by an amount that is independent of the data rate b and a function only of the code used and the target probability of error. There will be a value of this data rate that applies to the connection's copper section $b_{C_u}$, and the total access data rate b can never exceed this data rate so $b \leq b_{C_u}$ even if a digital regenerative repeater were to be used in a gateway in the home. Equivalently, $$SNR \leq SNR_{C_u}, \tag{9}$$

and, therefore, any supposition that an intermediate regenerative relay that would be placed at the south end of the twisted pair (e.g., a femtocell) would help increase fundamental data rate is false. In effect, there is no data-rate loss in simply sending the wireless LTE signal through the entire wireline/wireless cascade to the end device. There will be value in amplifying that signal (-and-noise sum) to reduce further wireless-link-noise-induced rate loss in the wireless segment beyond the copper segment, but this does not increase the end-to-end data rate of the access network, and (9) still holds. Thus, the 5G-DSL converter's simple up/down conversion of signals shown in FIG. 4 may be functionally similar with respect to a femtocell that might otherwise have been attached to the same wireline link (the femtocell presumably also having a much higher cost and complexity, not to mention issues of crosstalk between such femtocells and with the base cell).

Duplexing (whether in time or frequency) may be used in normal DSLs and also 5G-DSL (when there is just one wireline link). Consequently, the remaining significant performance limitation in multicarrier transmissions like those used in LTE, DSL, and Wi-Fi is the frequency resolution. Frequency resolution is the bandwidth of the narrowest transmissions that carries the same energy/dimension. If one system is closer to the optimum power spectral density than another, that system will perform better if the applied codes above modulation layer are roughly equivalent (that is both codes are pretty well selected, as is the case in modern systems). In G.fast systems, this resolution is 51.75 kHz today. G.mgfast systems will optionally increase this to 207 kHz. LTE systems have resource blocks comprised of a minimum of 12 15-kHz-wide tones or 180 kHz. The 5G-DSL frequency scaling on the wireline link increases this to 480 kHz. One or more resource blocks may be allocated to any user depending on that user's need for data rate. Clearly, G.fast and even G.mgfast have better resolution than the frequency-scaled 5G-DSL system, by either a factor of about 2.5 (mgfast) or 10 (fast).

A worst case for any rapidly decaying edge in 5G-DSL LTE's wireline link would be about half of the equivalent bandwidth should have been zeroed and the other half used. A severe worst-case assumption might be that this at most happens at most 2 times in any given channel, meaning that there are 500 kHz of bandwidth that was incorrectly excited with respect to optimum. For a system with the minimum bandwidth of say 2 MHz tones (leaving pilots and edge tones out of the 128 minimum), this represents a 25% loss in energy (−1.3 dB). Further, to recover the data sent on the 25% of tones (that would be lost or at very high probability of error) would require a code with that amount (and at least decoder erasures or more sophisticated iterative decoding presumed) in redundancy or 25% (or at least 25% of the codeword must be parity/redundant). Effectively the 0.18 dB energy loss and the total rate-loss equivalent in dB is $$-1.3 + 10 \cdot \log_{10}\left(\frac{2^{.75 \cdot b} - 1}{2^b - 1}\right) dB. \tag{10}$$

In this example, the loss is about 3.5 dB for simple BPSK (so b=1) and increases to 10.3 dB for 4096 QAM (or b=12). The loss is greatest for narrow channels, but if the FFT size increases to 1024 (so that the channel bandwidth is closer to 20 MHz, then this loss reduces to 5% errored bandwidth (−0.23 dB) and 0.95%, or equivalently to an additional 0.3 dB, so 0.5 dB total loss for BPSK and about 3 dB total loss for 4096 QAM. For wireless transmission, the probability of error relationship to SNR loss is less strong (because of random fading on the wireless link) and these worst-case loss levels appear within the range of acceptable.

DSL systems use today at least a 6 dB margin to guard against time-varying noise on the wireline link. This time-varying noise is equivalent to a time-varying channel gain in wireless. However, the wireless variation is more rapid and more severe than in wireline, and LTE's codes already accommodate such variation. This makes DSL's 6 dB margin superfluous. With realization of this DSL practice, the 5G-DSL system may perform better on the wireline link than the DSL system would have (basically better more robust codes are used in wireless for time-variation, making the margin unnecessary or at least allowing for its significant reduction). DSL systems do use physical-layer retransmission protocols, but LTE's more advanced Hybrid ARQ does not have an exact equivalent in DSL.

Link and higher-layer protocol losses are assumed otherwise to be roughly equivalent in today's LTE and DSL systems (both having throughputs well below actual bit rates on the connections) because of these overheads. Thus, LTE's resolution loss with respect to optimized DSLs is at worst-case a few dB. This flexibility and cost savings from various implementations of 5G-DSL systems reduce deployment costs, operation costs, and facilitate converged network use.

Uplink Association

Many wireless systems (such as LTE, 5G or Wi-Fi) client device (sometimes called a UE) nominally search certain frequency bands, and then channels within those bands for downlink signals. The UE has a SIM card from the service provider that typically prioritizes certain bands for the search. In the case of certain 5G-DSL embodiments, the 5G-IF downlink carrier frequency presumably is in those searched bands, which carrier frequency is communicated to the 5G-IF through the 5G-DSL control channel. In the case of LTE, the downlink signal will be decoded for a fixed/known-code Physical Broadcast Channel (PBCH) that has (at 40 ms intervals) embedded control information intended for UE's. This information will provide the uplink carrier frequency that is associated with the downlink and upon which the UE uplink signals can transmit (and thus associate to LTE and the uplink carrier frequency used by the 5G-IF). Multiple UE's may use the same downlink with different resource blocks. The same number of corresponding UE's that the LTE system can handle without 5G-DSL remains the same. Similarly, the LTE uplink will assign different resource blocks to be transmitted on the same uplink carrier by the different UE's (LTE has an uplink random-access channel, RACH, that can be used to address multiple UE's who initially try to associate at the same time).

For many reasons beyond transmission (like security), the device should associate with a specific RAN, similar to what is done with LTE association, Bluetooth pairing, or Wi-Fi SSID selection today. This presumably continues present practice with 5G-DSL being transparent to these issues. Once the association is established on a commonly known frequency, information to initialize at other specified known carrier frequencies is possible thereafter. Beyond this association, the client device need not know it is talking to a 5G-DSL or directly to a base station. The 5G-DSL systems simply need to know the carrier desired by the LTE system, which is sent to the 5G-RF over the control channel (for both downlink and uplink). This amounts to a multiplier of the 30.72 MHz (or other multiple thereof) base clock to the carrier frequencies as in FIG. 5. If the base station is not baseband and the carrier is not communicated, then the 5G-IF's extra demodulator would (downlink) sense the carrier frequency and then communicate it over the control channel to the 5G-RF. For uplink, the 5G-RF would sense any carrier and communicate it over the control channel to the 5G-IF's extra remodulator.

Y5G alternative for Wi-Fi

Figure 6:
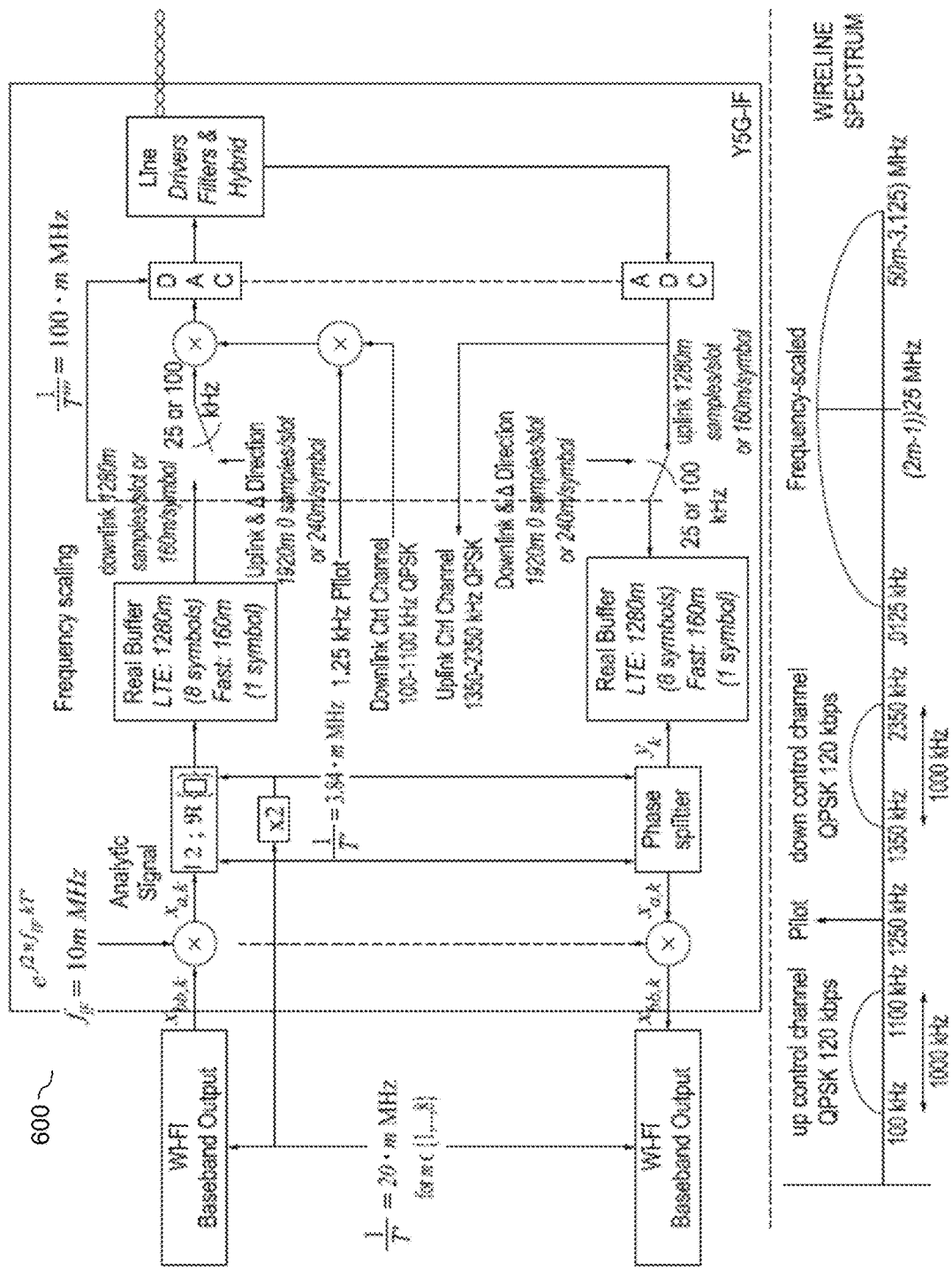
FIG. 6 is a block diagram of a Wi-Fi and wireline architecture according to various embodiments of the invention.

One skilled in the art will recognize that various embodiments of the invention may be applied to Wi-Fi-related deployments. Wi-Fi has many variants, but they all use a base architecture with channels of width 20 MHz (or integer multiples thereof). FIG. 6 provides an exemplary Wi-Fi deployment 600 in accordance with various embodiments of the invention. The simplified acronym Y5G-DSL used to abbreviate Wi-Fi used with DSL in the cascaded wireline/wireless fashion introduced first here for LTE other cellular deployments. The "Y" distinguishes the Wi-Fi from LTE. The Wi-Fi baseband output (downlink) and input (uplink) will be associated here with an access point (AP), although use (or equivalents to use) of mesh points is addressed later. Wi-Fi's baseband output is carrier-modulated to move DC to the mid-point of the band (so 10, 20, 40, or 80 MHz). The Wi-Fi symbol rate is 250 kHz, and the width of each tone is 312.5 kHz. There are minimally 64 total tones in the narrowest channel of 20 MHz. Tones at the band edges are zeroed, at least 4-5 of them, leaving over 1 MHz of available space for the 500 kHz pilot and control channel below 1 MHz, as shown.

The Y5G-DSL system frequency scales by the factor 2.5 with the Y5G slots being 40 s, which allows in the long mode for 10 slots at 25 kHz slot clock, of which 8 are used and 2 remain for duplexing reversal in certain embodiments of the invention. In the fast mode, again duplexing occurs for each symbol to minimize total delay. For the long-mode, the Y5G-IF delay is 40 s, while for the fast mode, this delay reduces to 5 s. It will be convenient on short lines to allow the value of $m_{Y5G}$ to exceed the value of $m_{Wi-Fi}$. This will allow some interesting multiplexing options with MIMO and multiple users which is discussed in more detail below.

While Wi-Fi is already time-duplexed randomly with CSMA, embodiments of the Y5G-DSL frequency-scaled system improves the multiplexing of multiple spatial streams (and/or multiple spatially multiplexed users). In these examples, the simple duplexing of FIG. 6 yields to the two different users' (uplink and downlink) bursts in opposite directions to occupy the same frequency-scaled bandwidth. With CSMA, this would have happened anyway without the frequency scaling. However, the frequency scaling helps when there are multiple spatial streams to multiplex. The embodiments set forth in FIG. 6 could instead, for instance, correspond to 2 downlink users bursting, with one user occupying the symbols (time periods) allocated for upstream with $m_{Wi-Fi}=1$. With $m_{Y5G}>1$, but $m_{WiFi}=1$, then $2.5 \cdot (m_{Y5G}/m_{Wi-Fi})$ additional users' (spatial streams) can be multiplexed by borrowing samples from the extra $80m_{Y}5G$ samples that were used for down/up reversal on each symbol in fast mode. For instance, if $m_{Wi-Fi}=m_{Y5G}=1$, then 2 users' (spatial) streams are handled (with no uplink present). However, with the 5G-IF (and corresponding 5G-RF) operating with $m_{Y5G}=2$ (and $m_{Wi-Fi}=1$), the original 2 streams double to 4, but also a 5th is added from the extra samples.

If $m_{Y5G} \rightarrow 4$, 10 total streams can be accommodated. Each of these streams will see the same performance with frequency scaling, which preserve the spatial MIMO processing that occurs in the Wi-Fi AP. A variation in the wireline spectrum component of spatial streams that are viewed as being on the same carrier by the external Wi-Fi signal processing can cause great distortion.

The Wi-Fi system has poor resolution compared to LTE or DSL (basically 20 MHz instead of 200 kHz, so a factor of 100 lower resolution). However, physically a Wi-Fi access point is likely to be closer to its client devices (than the LTE RAN). Wi-Fi further does not mandate inter-access-point synchronization with a master network clock. Thus, group-delay estimation may not be mandatory in certain deployments. Wi-Fi also may not have the strict inter-access-point timing reference synchronization requirements of LTE in some deployments.

In certain embodiments of the invention, the Wi-Fi channels can be multiples of 20 MHz, and the index $m_{Wi\text{-}Fi}$ (similar to LTE architectures for Y5G-DSL in the application) where modem Wi-Fi systems, $m_{Wi\text{-}Fi} \in \{1,2,4,8\}$. Again, shorter wireline link length means higher values of m are readily feasible in Y5G-DSL, at least for the wireline link.

Figure 7:
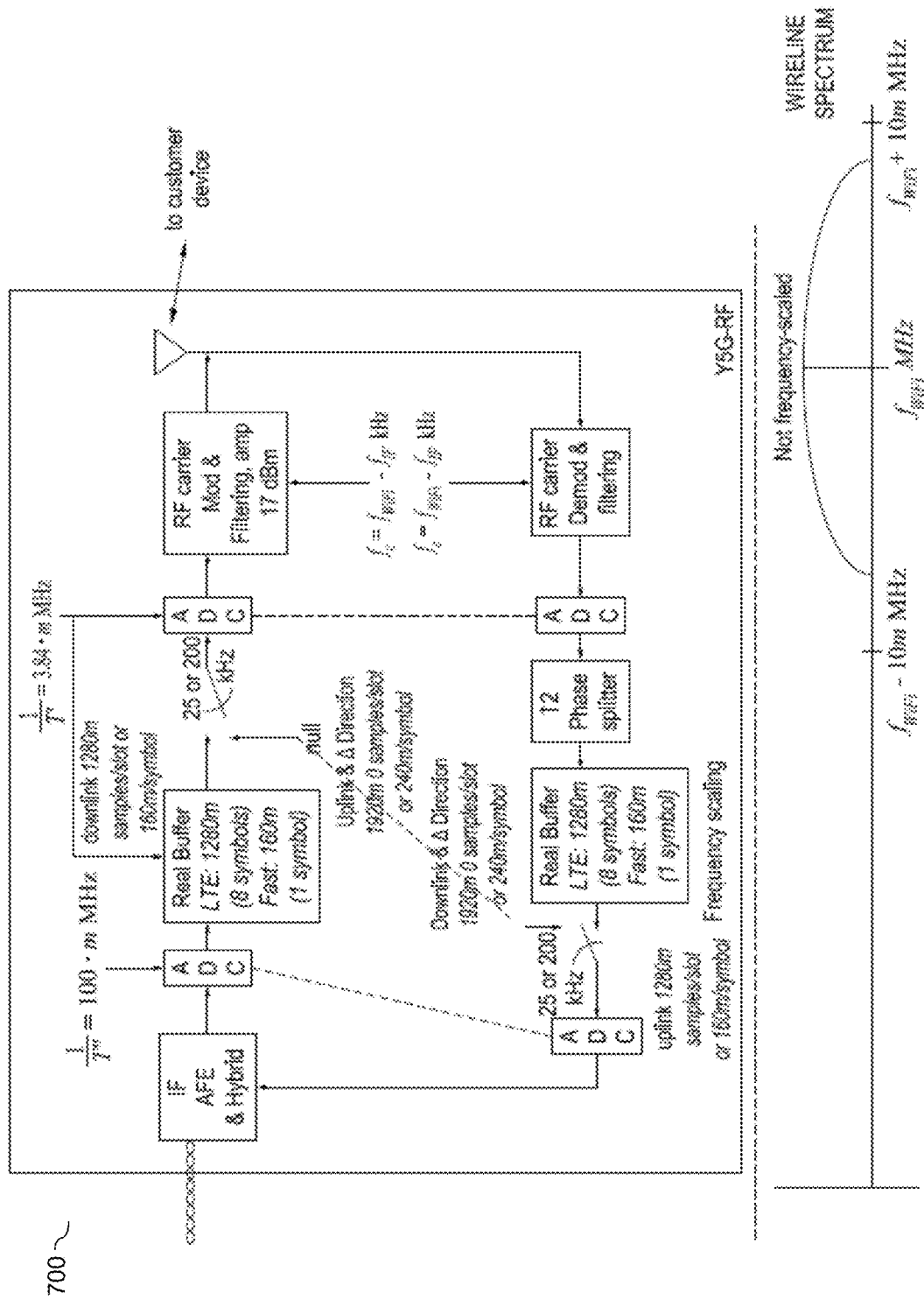
FIG. 7 is a Wi-Fi-RF architecture according to various embodiments of the invention.

FIG. 7 shows the corresponding Y5G-RF system 700 at the end point close to the client devices according to various embodiments of the invention. The pilot and control channels are shown, and the master clock can be any integer multiple of 100 MHz in this example. Various same group-delay offset mechanisms used in 5G may be used in Y5G-DSL also to advance signals by the negative of the measured wireline group delay so that effectively the system advances through the use of a slightly shortened cyclic prefix.

Cloud Control of the (Y)5G-IF and (Y)5G-RF and the Extra Channel

Figure 8:
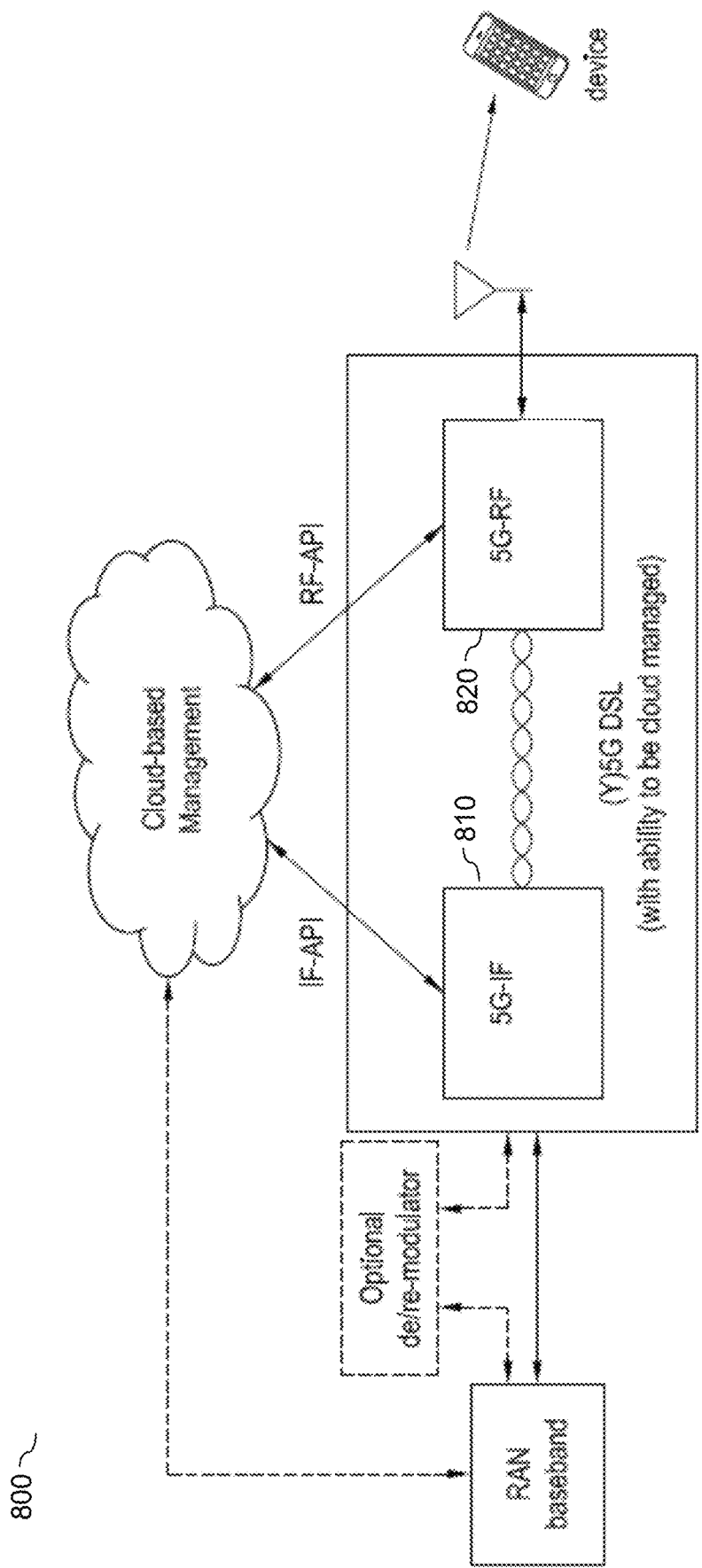
FIG. 8 illustrates a cloud-managed cellular and wireline architecture according to various embodiments of the invention.

5G-DSL and/or Y5G-DSL cloud management implementations 800 are shown in FIG. 8 in accordance with various embodiments of the invention. The cloud controller has access (through an internet address/connection application-programmers-interface or API) to the 5G-IF 810 and 5G-RF 820. Various maintenance data (some of which have been previously described) may be collected through probing functions implemented within these two systems. Such probing can for instance use channel sounding. In certain embodiments, only one of the (Y)5G-IF 810 and (Y)5G-RF 820 needs an external connection to the cloud and the other would be connected through the use of the control channel.

The cloud interconnection may be treated by the control processor of the 5G-IF implementing a low-speed LTE-user channel for an IP addressed assigned by LTE to the 5G-IF according to various embodiments of the invention. This could be viewed as a low-bandwidth internet of things connection, thus treating the 5G-IF's cloud control port as one of those things. One method may use the 5G-DSL's silent time periods for a wireline data connection to customer premises, so that any non-LTE (legacy or otherwise) application devices in the home could continue service—for instance, an existing Wi-Fi connectivity might be in the home and connect with non-LTE devices. In certain examples, the existing services would be supported by an existing fixed-line capability on the twisted pair (e.g. a DSL service) and would support a data stream (downstream and upstream) at the line terminal (north side) of the wireline connection.

The existing connection's support could add the IP address for the 5G-DSL system (the (Y)5G-IF and/or the (Y)5G-RF). Various methods may be used to encapsulate the existing internet connection signals at the north end and now send them over the extra channel created by use of (otherwise) silent periods. The control channel itself also has available bandwidth for such service even when downlink and uplink signals are present. The bursts would allow a modulation system of choice to the designer but there are 200m samples/symbol in 5G-DSL and 80m samples/symbol in Y5G-DSL that are available for such legacy use. These would for example support data rates of a few Mbps (a 5G-IF to 5G-RF bursted DSL system in effect then exists that replaces an existing one at about 1/3 the existing one's data rate, but with the remaining 2/3 being used by LTE). Certain implementations of this system may use the DSL processor of for instance an existing ADSL design within the bursts (and the DSP needs for such designs would be only a small computational increase for the local processor, especially running at lower speeds (apart from the higher-speed sampling rates in the bursts) to decode the lower data rate). Such systems do not need a full LTE baseband demodulator to capture cloud control signals sent to them and may service existing legacy services and the cloud-control communication.

The (Y)5G-RF can measure uplink wireless power levels (and can infer them downstream, or even intercept them for certain management packets that pass through the connection). The 5G-RF can also control power levels and could adjust certain channels' carrier frequencies to appear contiguous at the access point when indeed they are discontiguous on the actual channel. In effect, a more flexible system is created through the cloud management, allowing various multi-user methodologies or resource management to be used.

When the wireline link is an Ethernet cable of 4 pairs (8 wires), this creates a wide variety of possibilities to create a large efficiency in a Y5G-Ethernet-based system. Optional dashed-line connections are shown to the device and to the RAN, which could allow additional options in the system, particularly synergistic with opportunities created by virtualization of RANs or applications/services control.

MIMO Expansion of 5G-DSL and Y5G-DSL

MIMO methods are extensively used in wireless to improve spatial coverage and efficiency. This section investigates how to use them fully with (Y)5G-DSL and also to expand them to more productive use of many antennas.

The wireless (or common) modes of wire pairs, which essentially can be used to double the transmission capacity of the wireline when used in the wireless-equivalent total link may be used. As will be discussed in more detail, a simple multiplexing enhancement of the 5G-IF may be implemented to ensure no spatial modes are blocked by an insufficient number of otherwise high-frequency-bandwidth wireline links. In addition, a fairer and more usable alternative to the spectral-spatial expansion of the wireline link's bandwidth to make full use of MIMO methods may be implemented, introducing a possibly-cloud-managed 5G-RF+ that has mid-MIMO capabilities that can increase total bandwidth. In certain embodiments, the system may have a precoder that is implemented in the context of working with an existing LTE MIMO system. The precoder's use occurs because of the frequency-scaling (or time-bursting equivalence). An in-home multi-wire use of Wi-Fi instead of LTE may also be deployed that attempts to be well-matched to unlicensed spectrum use for home distribution systems.

Use of Wireline's Wireless Modes

Many homes have single twisted pair with 2 wires. In wireless transmission cascaded with copper transmission, the possibility of sending a wireless signal on each wire may be implemented in accordance with various embodiments of the invention. These systems would have larger wireless mutual and external crosstalk on both links, but nonetheless MIMO principles may be applied to reduce this crosstalk. The two transmissions, one initially on each wire, may be in the same band such that the external system may perceive them as parallel spatial streams (e.g., LTE). The MIMO baseband processing system may effectively remove the crosstalk that flows in the same direction (full duplex operation is not possible because cancellation of echo (crosstalk) from other UE's uplink signals in the copper section is not possible physically in opposite directions). A 5G-DSL loss of bandwidth to time-domain directional changes may be recovered or almost recovered since this system would effectively double data rate. Similarly, the system (e.g., LTE, 5G, Wi-Fi, etc.) would consequently be able to use 2 corresponding spatial streams. Traditionally, such common-mode transmission in telephony was avoided because the much larger crosstalk reduces signal-to-noise ratio if considered as (other users') noise (relative to differential transmission using both wires for one differential signal). However, with LTE's or Wi-Fi's MIMO crosstalk reduction, such concern becomes less of an issue.

5G-DSL may still need to buffer (and frequency scale) downlink and uplink signals to multiplex into down/up time slots, just two such identical buffers occur in parallel, one for each wireline link in various embodiments of the invention. One skilled in the art will recognize that a channel may be referred as one wireless channel (or resource block if multiple users present) whether or not it corresponds to a single channel on a wire pair or to one of 2 channels in parallel using the common mode in certain examples. In the latter case, line/antenna performance data rates may be approximately doubled without change of basic analysis and theory.

Exploitation of MU-MIMO and Frequency Scaling

Different frequency-scaled channels on the same wireline link can use effectively the same carrier on the wireless link (but on different spatial streams) because of the common frequency source for the (Y)5G-DSL carriers. These may correspond to the time-division duplexed bursts of the 5G-IF and 5G-RF wireline link's transmissions, which is an imitated form of space-time transmission.

Figure 9A:
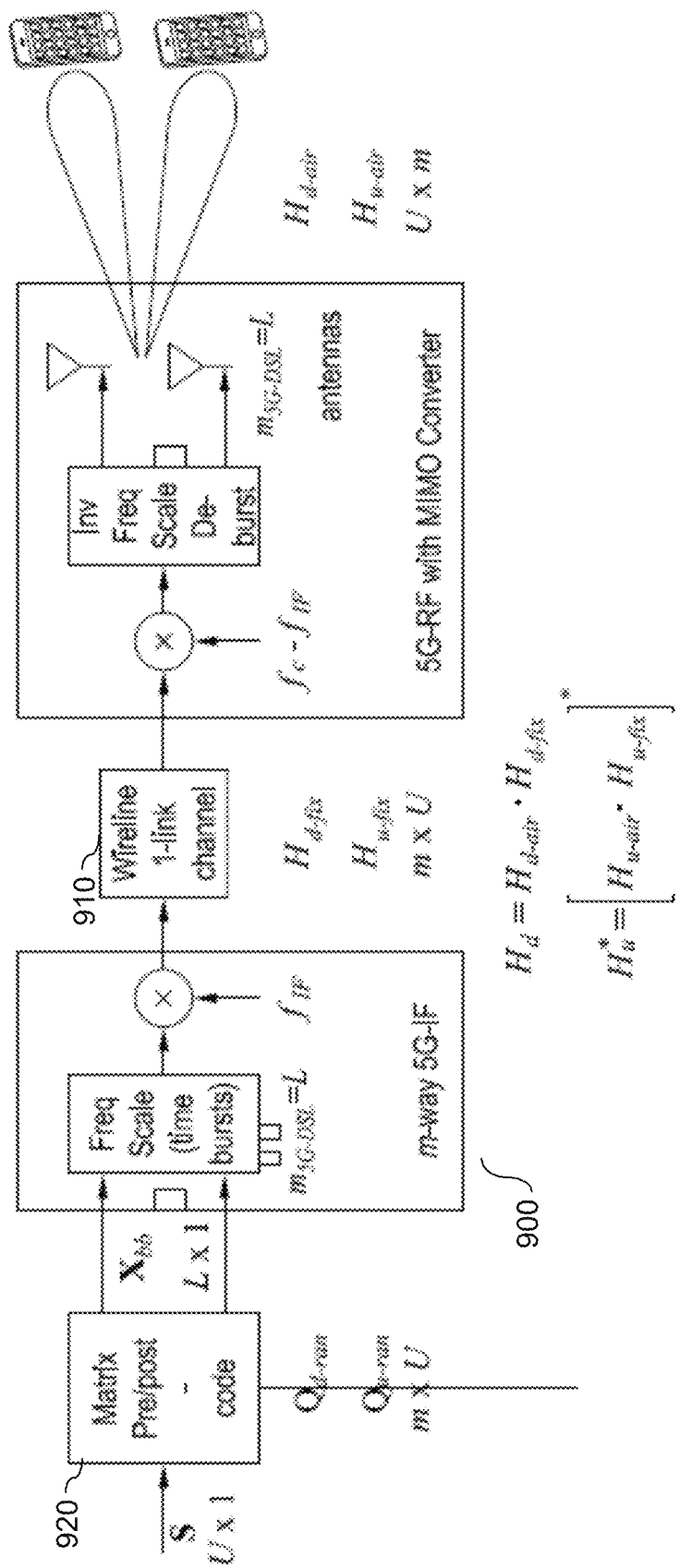
FIG. 9A is an exemplary single-wireline-link for cellular and wireline architectures with spectral-spatial translation according to various embodiments of the invention.

FIG. 9A illustrates that a single wireline link 910 has $m_{5G\text{-}DSL}$=L channels where L is the number of spatial streams, with now a slightly expanded interpretation of the 5G-DSL's systems bandwidth index m→$m_{5G\text{-}DSL}$ in accordance with various embodiments of the invention. For example $m_{5G\text{-}DSL}$=2 could correspond to L=2 spatial Wi-Fi channels if the line length is sufficiently short (e.g., <400 m) to support the corresponding 100 MHz of bandwidth (with sampling rate 200 MHz) that is required to frequency-scale (time burst) both spatial streams through the wireline link. The spatial streams are translated to spectral streams for the wireline link.

In FIG. 9A's m-way system 900, there is no crosstalk between the wireline channels in the different time bursts, say for instance with an LTE system using two 20-MHz-wide spatial streams ($m_{LTE}$=16 for the original m definition on each LTE spatial stream, but the wireline link has $m_{5G\text{-}DSL}$=2 channels time multiplexed with a single IF carrier at 18.4 MHz), which then ultimately occupy the same wireless frequency band (use the same RF carrier) between the 5G-RF and the user device(s), and thus also on the wireless link. The 5G-RF uses the same carrier to modulate separately each of the two spatial streams, one for each of the antennas. The spatial crosstalk may entirely occur in the wireless link as long as they are in different bursts on the wireline link. The matrix transmit precoder 920 processing shown (as a matrix multiply on the left in FIG. 9A) leads to users' spatial separation at the two different home client devices.

A number of spatial streams equal to the number of wireline frequency channels are virtually assured if the equipment supports massive MIMO because each spatial stream can be supported by one of the m frequency-scaled time-burst channels on the wireline link. In the case of an LTE deployment, the frequency separation on the wireline link facilitates LTE's ability to orthogonalize spatial streams with respect to full all-wireless connection. (Signal processing power may then be applied to the in-home wireless crosstalk rather than crosstalk on a longer length wireless channel with more potential for attenuation and crosstalk interference.)

More mathematically following FIG. 9A, U=2≤ $m_{5G\text{-}DSL}$=L user devices use the LTE channel according to various embodiments. A U×1 vector s contains the two downlink user-input streams intended for the two customer-premises-located users. The downlink precoder 920, implemented by the RAN as an m×U matrix multiply, has the m×1 vector output $$x_{d\text{-}bb} = Q_{d\text{-}ran} \cdot s_d, \quad (11)$$

which enters the 5G-IF 900. FIG. 9A presumes the RAN baseband has L spatial radios (which is typically true with L antennas so there is one radio/antenna). Instead of feeding antennas, these L connections feed the $m_{5G\text{-}DSL}$=L 5G-IF connections in the (complex baseband) time domain. The downlink wireline channel (including effects of any frequency scaling) has an output (with wireline noise organized into an m×1 vector $n_{bb,fix}$)

$$y_{d\text{-}bb,fix} = H_{d\text{-}fix} \cdot x_{d\text{-}bb} + n_{d\text{-}bb,fix} + H_{d\text{-}fix} \cdot Q_{d\text{-}ran} \cdot s_d + n_{d\text{-}bb,fix}. \quad (12)$$

The number of spatial channels $m_{5G\text{-}DFE}$=L can exceed the number of users (and should be at least equal to the number of users with linear precoding—nonlinear precoding can accommodate smaller numbers of spatial-channels). The downlink wireless channel then has a U×1 vector output (with overall noise $n_{bb}$ and each output component corresponding to the signal received at the user device)

$$y_{d\text{-}bb} = H_{d\text{-}air} \cdot H_{d\text{-}fix} \cdot Q_{d\text{-}ran} \cdot s_d + n_{d\text{-}bb}. \quad (13)$$

If there were one user device with two antennas, the input $s_d$ could continue to have two components, one for each spatial mode that reaches the 2-antenna device. In this case, $H_{d\text{-}air}$ would remain a 2×2 matrix, and there is additional LTE-device signal processing to decode the two modes and output the corresponding one-user data stream. The uplink processing reverses the flow in FIG. 9A. The channel may be defined as the (conjugate in complex baseband) transpose of the forward path, recalling that the multiplication of a chain of matrices has a transpose that reverses the order of the multiplication. The conjugates simply negate imaginary parts in defining/measuring the channel coefficients. This transpose notation is used in FIG. 9A, but the equation can be written directly as $$y_{u\text{-}bb} = Q_{u\text{-}ran}^* \cdot H_{u\text{-}fix}^* \cdot H_{u\text{-}air}^* \cdot s_u + n_{u\text{-}bb}. \quad (14)$$

As shown in FIG. 9A, the LTE RAN processing only sees the equivalent channels $H_d = H_{d\text{-}air} \cdot H_{d\text{-}fix}$ and $H_u^* = H_{u\text{-}fix}^* \cdot H_{u\text{-}air}^*$. The matrices $Q_{d\text{-}ran}$ and $Q_{u\text{-}ran}^*$ an are determined by the LTE processing as functions of the corresponding channel matrices.

MIMO Antenna Virtual Multiplication

Figure 9B:
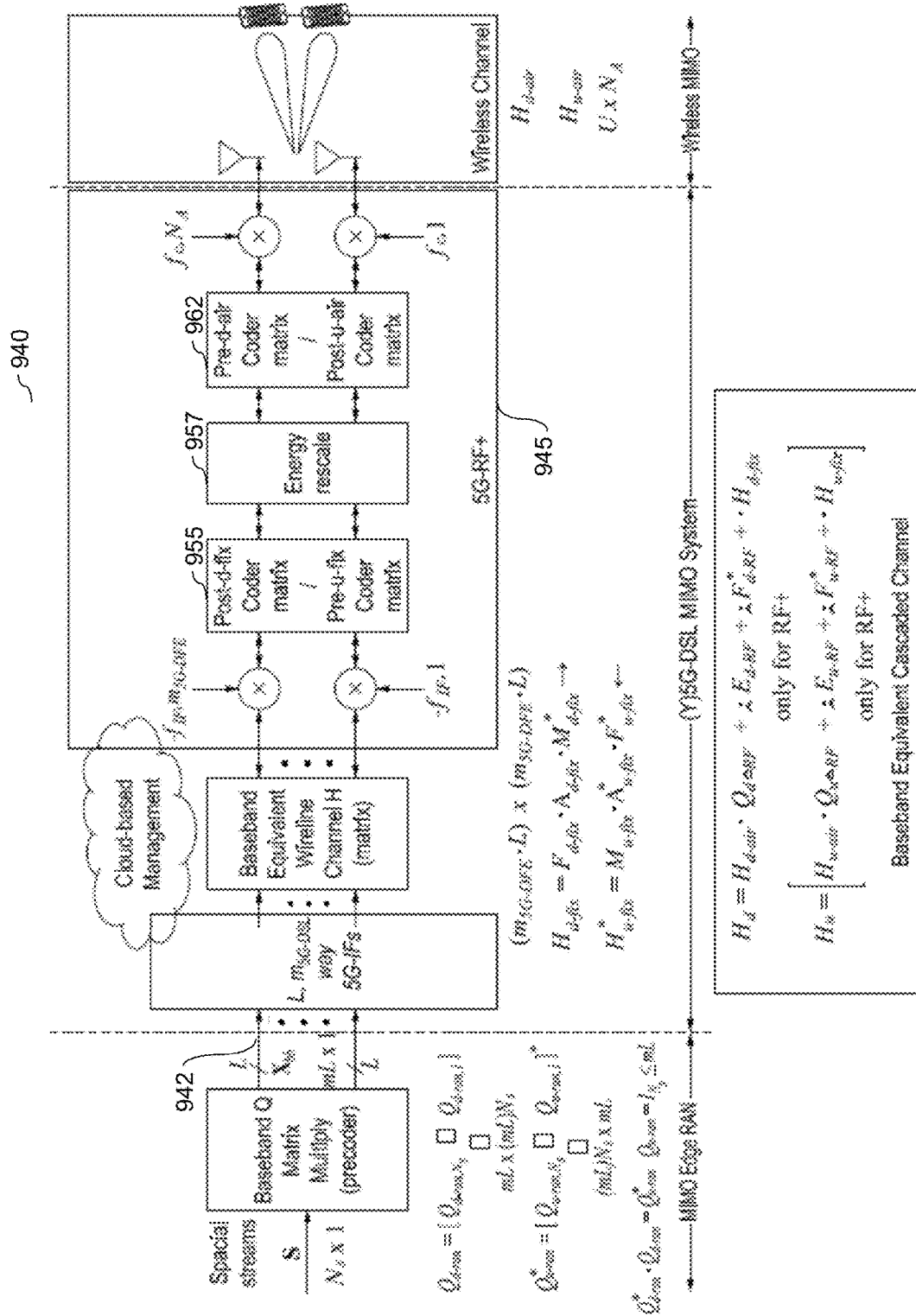
FIG. 9B illustrates a full MIMO implementation of a cellular and wireline architecture with RF+ that allows for intermediate steering according to various embodiments of the invention.

FIG. 9B illustrates a more complex system 940 where L wireline links available in accordance with various embodiments of the invention. In such a system, up to $m_{5G\text{-}DSL} \cdot L$ spatial channels 942 could be carried by these wireline links, which presumes the RAN baseband has digital modulation support for that many wireless links. An increase in cost (the additional digital processing) could significantly increase the capacity of the overall system through 5G-DSL. The capacity increase may further decrease the cost per supported user.

There may be crosstalk between the wireline links on those channels that occupy the same frequency channels. In this case, the 5G-RF could remain the same, but FIG. 9B shows an optional mid-MIMO 5G-RF+945 processing that can be used to improve performance. The MIMO wireline $H_d$ and $H_u$ matrices can be learned by simple extension of the channel sounding previously described. The mid-MIMO processing may not be necessary because the RAN baseband system's signal processing presumably has a sufficient number of spatial channels. However, when there is more than one device active at the customer premises, the intermediate processing in the 5G-RF+ allows for higher performance by improving the performance on the wireline link that is essentially full MIMO (a single aggregate bit rate) that is improved through channel singular value decomposition. This processing may be preferred for the aggregate data rate on the wireline link, decomposing it into a parallel set of channels with highest performance and data rate possible.

The outer system may more easily apply MU-MIMO. In certain embodiments, the outer wireless link is based on a corresponding MU-MIMO optimum with QR factorization. The system may implement one of the unitary matrices of singular value decomposition, while the other will be in the 5G-RF+, where then appropriate energy scaling can be used and the 5G-RF+ can implement the final unitary matrix that completes the MU-MIMO signal processing for the wireless link. With such processing, the number of antennas $N_A$ at the 5G-RF+ output can exceed the number of spatial streams/limits at the RAN baseband system, further improving performance.

Mathematically, Equation (11) still holds except that the input contains $N_S$ spatial streams that may be each for an individual user or can be combined to increase the data rates for a smaller number of users. The RAN baseband precoder matrix $Q_{d\text{-}ran}$ then becomes $mL \times N_S$, which is really a combination of a diagonal gain scaling of spatial-stream energies that is $mL \times N_S$ and the following $mL \times mL$ matrix, so $$Q_{d-ran} = \underbrace{\tilde{Q}_{d-ran}}_{mL \times mL} \cdot \underbrace{E_{d-ran}}_{mL \times N_X \text{ diagonal}}, \quad (15)$$

for a linear precoder system. The nonlinear precoder would result in $E_{d\text{-}ran}$ being generalized triangular and defining a dirty-paper precoder, but neither LTE nor Wi-Fi systems today allow for this. Nonetheless, if the number of antennas is much larger than the number of streams, the performance difference that accrues to approximating the generalized triangular matrix by its diagonal is negligible. FIG. 9B simply shows the transmit matrix with the downlink channel having singular value decomposition (SVD)

$$H_{d\text{-}fix} = F_{d\text{-}fix} \cdot \Lambda_{d\text{-}fix} \cdot M_{d\text{-}fix}^* \quad (16)$$

as shown. The RAN baseband system may have $\tilde{Q}_{d-ran} = M_{d\text{-}fix}$. In this case, the mid-MIMO post-d-fix matrix 955 may be $\tilde{F}_{d\text{-}fix} = F_{d\text{-}fix}$ and the wireline link will have been diagonalized into its fundamental modes. These modes may be scaled by appropriate energies 957 before retransmission (there is still no decoding of LTE codes or messages) and then scaled. The wireless downlink has the generalized Q-R factorization $$H_{d-air} = \underbrace{R_{d-air}}_{U \times N_A} \cdot \underbrace{Q_{d-air}^*}_{N_A \times N_A}, \quad (17)$$

where the channel goes to the U user devices from $N_A$ antennas. The number of antennas can be increased at this point if desired. This is typically an antenna-placement point with lower power and lower cost. The full massive MIMO effect will also be greater because these antennas are closer to the users. The $R_{d\text{-}air}$ matrix in (17) may be approximated by a diagonal matrix in the $U \times U$ left columns (and zeros everywhere else). The downlink mid-MIMO precoder matrix 962 for the wireless link is then $Q_{d\text{-}RG+} = Q_{d\text{-}air}$, and the gains on the wireless links to each device are the diagonal elements of $R_{d\text{-}air}$.

The overall downlink system then has channel $$H_d \cdot Q_{d-ran} = H_{d-air} \cdot \underbrace{Q_{d-RF+} \cdot E_{d-RF+} \cdot \tilde{F}_{d-RF+}^*}_{\text{only for } RF+} \cdot H_{d-fix} \cdot Q_{d-ran} \cong \quad (18)$$

$$E_{d-air} \cdot E_{d-RF+} \cdot E_{d-ran},$$

where $E_{d\text{-}air} = \text{diag}(R_{d\text{-}air})$ and the diagonals have $\min\{N_S, N_A, U\}$ non-zero elements. The uplink system similarly has $$[H_{u-air} \cdot Q_{u-ran}]^* = \quad (19)$$

$$\left[ H_{u-air} \cdot \underbrace{Q_{u-RF+} \cdot E_{u-RF+} \cdot \tilde{F}_{u-RF+}^*}_{\text{only for } RF+} \cdot H_{u-fix} \cdot Q_{u-ran} \right]^* =$$

$$E_{u-ran} \cdot E_{u-RF+} \cdot E_{u-air}.$$

This system provides an opportunity for the 5G-RF+ to use the spectral-spatial translation effectively to increase cost effectively the number of antennas without changing the existing RAN. The computations (SVD, QR, etc.) need not be real-time and can be implemented in the cloud.

Residential Y5G-DSL

The basic Y5G architecture could follow that of the previously described LTE implementation but the value of sending Wi-Fi signals on wires from the internet service provider's nearest edge point may be dubious compared to the LTE solution. In certain embodiments, the Y5G may make better practical sense if used within customer premises. In particular, Wi-Fi multi-access-point (MAP) or mesh-point (MP) relay systems may be digital relay systems used within the customer premises. These systems reduce bandwidth efficiency (using two different Wi-Fi channels for the same data into and out of the MP relay) in exchange for improved coverage. The bandwidth loss can be significant when the collision protocol is considered and there are multiple Wi-Fi networks and users within the vicinity. Most customer premises however do have wires. There are often multiple in-home phone lines (an RJ-11 phone jack and cable for instance has two pairs of wires connected within it and indeed these often are supported by the wiring within the home). There are also power lines, possibly coaxial cable, and maybe other wiring systems within the home, although they will typically not terminate on the final end device. Instead they will terminate at various points within the customer premises at which a simple Y5G-RF converter could be placed (typically at far lower cost than a full MP or MAP).

Figure 10:
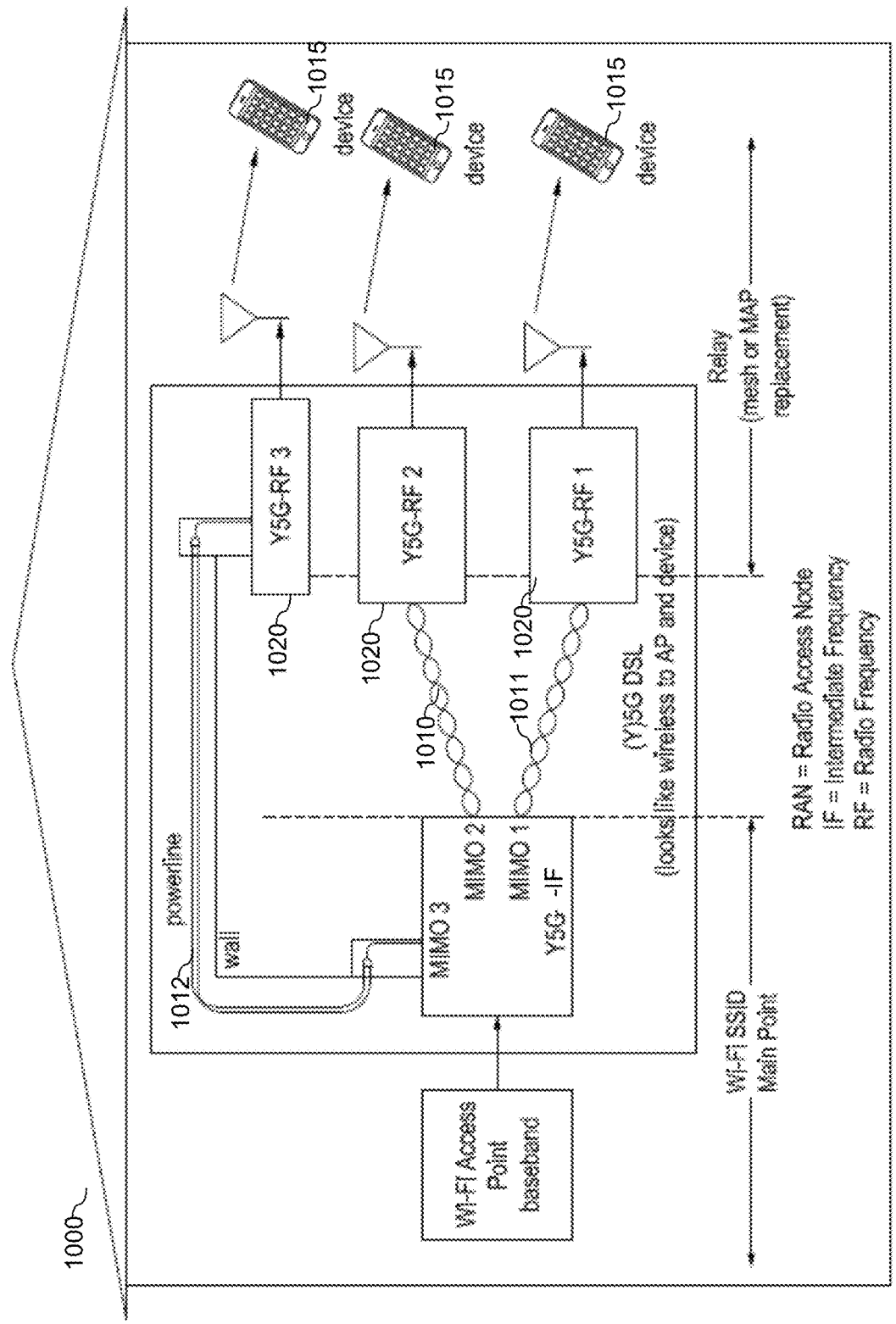
FIG. 10 illustrates a Wi-Fi and cellular architecture using in-home wiring to at least one mesh/multi-access point according to various embodiments of the invention.

FIG. 10 illustrates a residence 1000 that uses wireline connectivity to (all or most) different RF sites within the structure according to various embodiments of the invention. Shown are two twisted pairs 1010, 1011 and one power line 1012. However, other cabling like coaxial cable could also be used if present. The 3 Y5G-RF devices 1015 shown may be of the same type described earlier. This is essentially a distributed antenna system in basic architecture. In certain embodiments, the Y5G-RF devices 1020 are simple low-cost analog modulators (along with digital control channel) not full MAP or MP devices. Such a system exploits existing wires to (at least) place repeaters at many locations that would extend coverage (in addition to any locations that may still be needed and only can be reached by wireless relay connection). Such a proposed system's performance is, at a minimum, better for each wireline connection that saves a wireless channel for wireless use. Since the short connections within the home can support as many as 8 Wi-Fi channels, the performance improvement may be substantial. For instance, a Wi-Fi 6 (802.11ax) transmission that uses a significant portion of the 5 GHz band with relays will occupy the entire band for the length of its transmission because there are only two such channels at 5 GHz. The wireline portion in FIG. 10 also exploits the MIMO spatial channels because any spatial interference between signals will be confined to the wireless links since the spatial streams will be in different bursts. This allows more complete use of transmit energy on each such spatial stream and increases performance even more so. Further, only one channel is needed, not two.

Y5G-Ethernet, Mesh, and Enterprise

Enterprise Wi-Fi's use in small companies, branch offices of large companies, schools, apartment complexes, malls, and similar homogenous-access opportunity often requires coordinated-mesh control of multiple access points (MAPs) or mesh points (MPs). Such enterprise applications often will also have internal Ethernet cabling. The Ethernet cables may be used to connect a router to multiple Wi-Fi access points, but this does not by itself resolve contention issues of the access points' sharing of the common unlicensed Wi-Fi spectrum. Solutions increasingly emerge where many or all AP's (or the slightly reduced MP forms) are connected wirelessly with some coordinated selection of channels, in particular when using the MP's or AP's to relay signals to points too distant from a master AP for successful connection, that is to cover the enterprise. Coverage often involves allocation of different channels (even if same SSID) to different partitions of the enterprise space to avoid excessive collision. While coverage improvement can occur with the MAPs or MPs, overall network throughput may be rendered well below best levels possible. What would be more desirable is a more coordinated Wi-Fi system, effectively a massive AP functionality that covers more points but also is efficient in use of spectrum. The Ethernet cabling offers an opportunity to implement this massive AP functionality as described herein.

Y5G-Ethernet solutions using a single Ethernet cable as the first connection (instead of the telephone lines), again with simple devices and little (or no) need for full AP's at the Ethernet terminations—instead, the solution simply uses 5G-RFs to translate AP signals on the Ethernet-cable wires' south outputs into wireless signals according to various embodiments of the invention. Various embodiments may consider a single AP and a single Ethernet cable that contains 4 twisted pairs (or 8 wires). Other embodiments may use the multi-way 5G-IF concept to support several APs' signals on a single Ethernet cable, presuming the coordination of 4 physically co-located AP's in a Y5G-MAP. This system allows greatly enhanced use of multiple-antenna-capable AP's (with respect to a traditional mesh system). A 5G-RF+ deployment will be optionally re-introduced to enhance performance, as a Y5G-RF+ with additional details addresses a more sophisticated multi-user Y5G-RF capability that employs multiple coordinated Y5G-MAPs on a full Ethernet system of cables throughout an enterprise, yet further enhancing enormously Wi-Fi connectivity possibilities. These systems will add multiple 5G-RF+ capabilities.

In certain embodiments, the possibility of a cloud-based externally managed software system (that need not be in the AP's themselves) is suggested, rendering the overall coordination effectively independent of the Wi-Fi APs (apart from the access to the baseband signals prior to RF modulation as is the case throughout this paper). Such systems may allow maximum legacy compatibility with existing Wi-Fi systems' standards.

Single AP, Single Ethernet Cable, Y5G-Ethernet

While phone wires exist in most small businesses, typically internet connectivity has been achieved through Ethernet cabling (cat5, 6, 7 . . . ) from a server/IT location (closet) to working locations throughout the building/complex. Ethernet cable lengths are typically less than 100m, and therefore allow up to $m_{Ene}=4,8$. Thus, each pair can support a single 50-400 MHz-wide signal (the maximum bandwidth allowed in Wi-Fi 6 for instance in the bands below 7 GHz is 160 MHz, so 400 MHz is 2.5× this bandwidth for frequency-scaling and is feasible). A single Ethernet cable could support up to $N_{ss}\leq 8$ spatial streams.

Figure 11A:
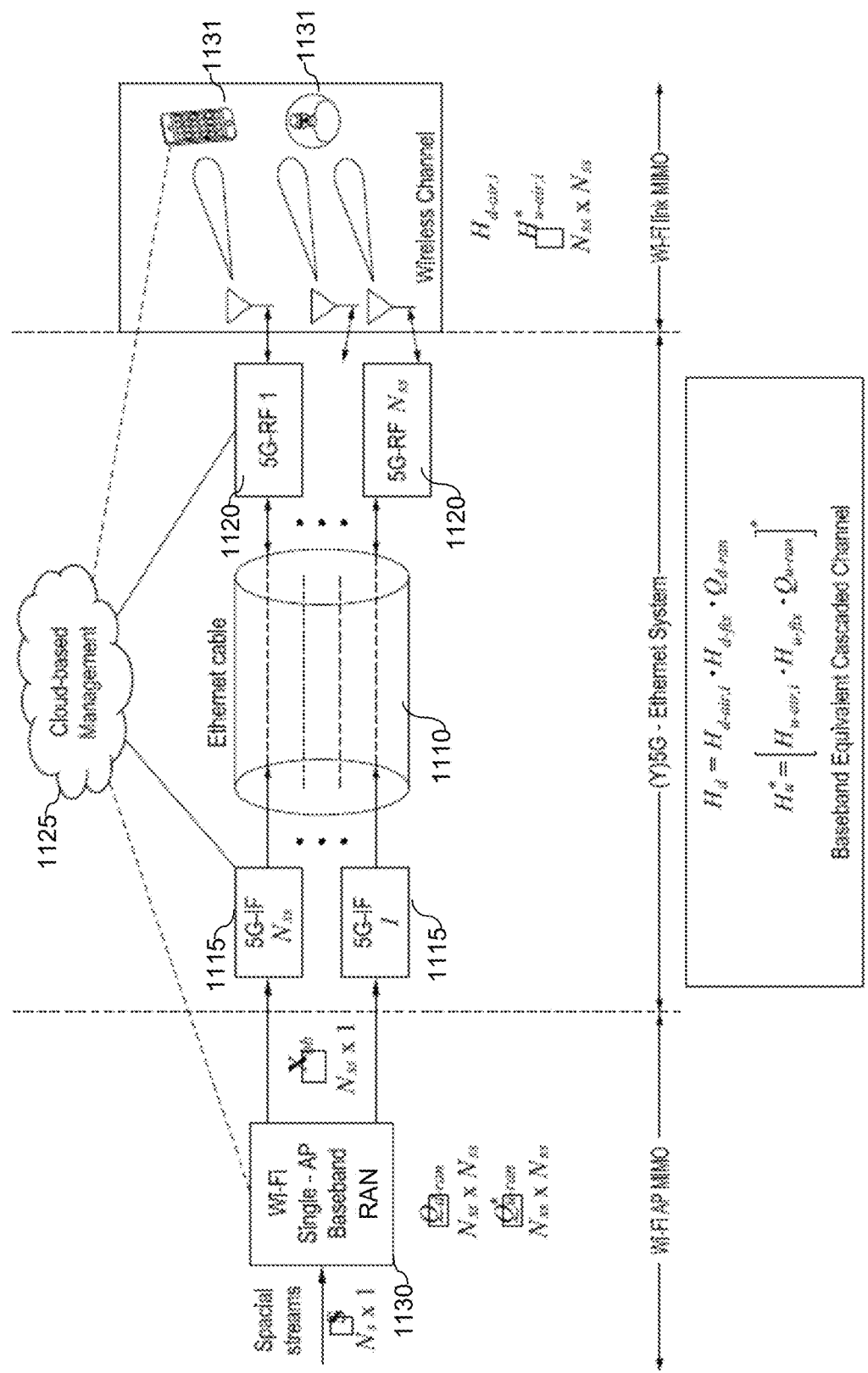
FIG. 11A is an exemplary single access point, single ethernet cable, Wi-Fi-cellular to Ethernet architecture according to various embodiments of the invention.

FIG. 11A's Y5G-Ethernet shows various embodiments with 4 links 1110 (presumably use of all 4 twisted pairs in differential mode here) and thus implies $N_S=4$. The 4 spatial streams (up to 160 MHz wide each) are transmitted downlink (and received uplink) at IF by the 5G-IF 1115. The 5G-RFs 1120 are shown as separate, one for each link through the Ethernet cable. Each of these has a single antenna and supports devices within the wireless coverage of the 5G-RF. Any and all MIMO processing is presumed in the baseband Wi-Fi AP system. The various transfers are listed in FIG. 11A as mathematical descriptions. The wireline link corresponds to the pairs in the Ethernet cable. There will be crosstalk between these pairs, and so the Wi-Fi baseband MIMO processing may also accommodate this crosstalk along with the crosstalk in the cascaded wireless section. Thus, Wi-Fi signals on different spatial streams in the same channel will need to correspond to coincident frequency-scaled bursts in the Y5G-Ethernet transmissions.

The cloud-management system 1125 allows for Y5G-IF and Y5G-RF power-level adjustment and carrier-frequency choices at the Y5G-RF 1120 in ways that may be completely transparent to the Wi-Fi AP 1130 and client devices 1131 that simply see a standard Wi-Fi channel in various embodiments of the invention. In effect, the Y5G-IF 1115 and Y5G-RF 1120 become low-cost internet devices (things) in the simplest enterprise case of Y5G-Ethernet. In certain examples, these devices may not decode nor view personal information, but simply act to assist the efficient allocation of the enterprise's unlicensed spectra. Optionally, it would be possible for a compatible Wi-Fi AP, and possibly also a compatible Wi-Fi device to provide information to the cloud management, as well as to accept policy advice or controls from it, as shown by FIG. 11's dashed lines.

The Y5G-Ethernet will support additional combinations described below.

Multi AP, Single Ethernet Cable, Y5G-Ethernet

Figure 11B:
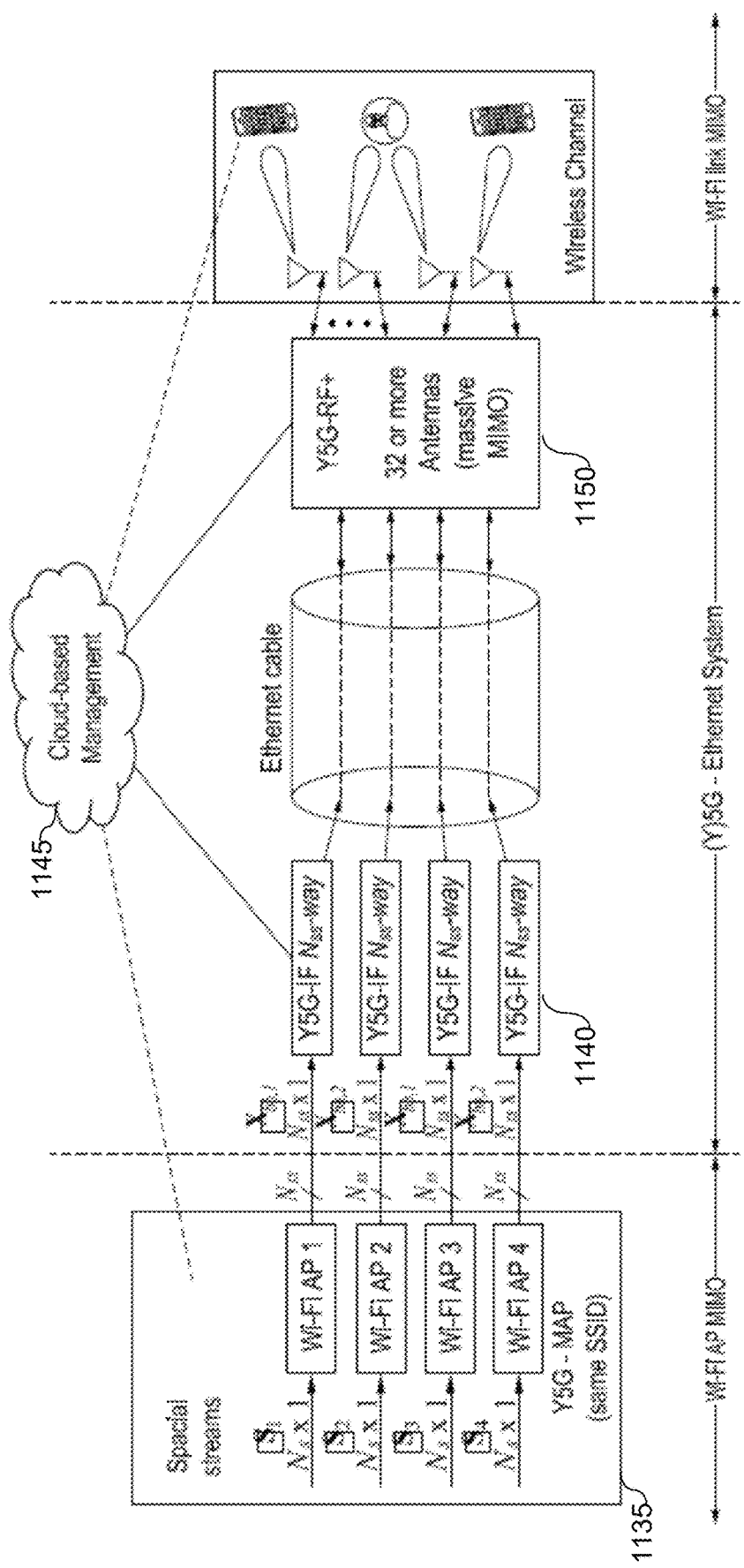
FIG. 11B illustrates multiple access points with a single Ethernet cable according to various embodiments of the invention.

FIG. 11B shows a coordinated set of 4 access points, here called a "Y5G-MAP" (Y5G-multi-access point) 1135 where all APs are in the same physical location according to various embodiments of the invention. The single Ethernet wire-pair full bandwidth may be exploited to carry a single AP's full set of spatial streams. This single pair (as a link) can carry at least 2-4 160-MHz wide channels and possibly all 8 depending on the length of the Ethernet cable and a two-link could carry all 8. The 5G-IF $N_S$-way 1140 version may be implemented to burst-multiplex with frequency scaling all spatial components into the single wireline link. FIG. 11B's system with 4 wireline links supports 4 access points. These 4 APs may be coordinated by an enterprise controller as well as being left as independent APs while cloud-based management 1145 instead provides the resource-management policy of carrier frequencies and spatial modes. One skilled in the art will recognize that with a single Ethernet cable and the 5G-RF can now become a 5G-RF+1150 that allows increase of the number of antennas (up to 32 spatial streams are already from the existing Wi-Fi system, but more antennas may be placed at the 5G-RF+ output to expand the ability to support multiple devices in limited crowded space, as may likely occur in an enterprise application).

Multi AP, Multiple Ethernet Cable, Y5G-Ethernet

Figure 11C:
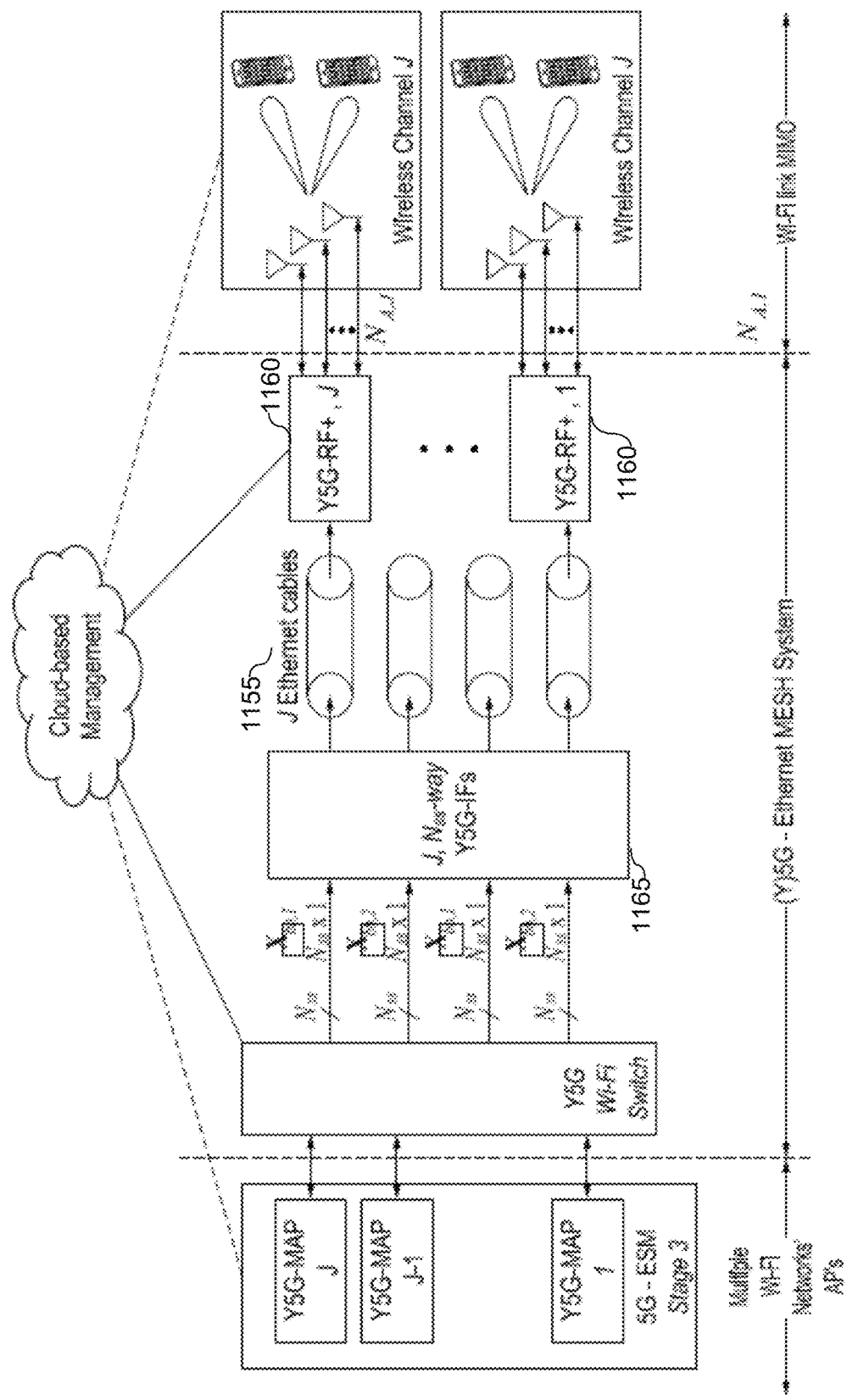
FIG. 11C illustrates multiple access points, different SSIDs, and multiple Ethernet cables according to various embodiments of the invention.

FIG. 11C illustrates a multiple Ethernet cables deployment according to various embodiments including on functioning as the infrastructure in an enterprise application. These cables 1155 will, at the client side, be in multiple physical locations within the enterprise. Multiple Y5G-MAPs 1160, in what could be called a massive MAP situation appear at the "IT-Closet" side of FIG. 11C. These each could connect to their own $N_{ss}$-way Y5G-IF 1165, but a new Y5G-Wi-Fi switch has been added to address coverage problems. One issue in Wi-Fi coverage may be that another access point or SSID is physically closer to the target client device than the one with the correct SSID for access. The switch allows a virtual physical relocation of any access points to any of the multiple Y5G-RF+ points (on one channel, several, or all). There may be J Y5G-MAPs shown to cover all J of the physical Ethernet cables going to different physical locations. Such switching should take care to avoid introduction of wireline link crosstalk from two different AP's for which baseband MIMO processing is not coordinated. The AP's may be synchronized and use cloud-based management of the now coordinated set to avoid change to the existing Wi-Fi, other than the access to the baseband signals.

Mega MIMO

Figure 11D:
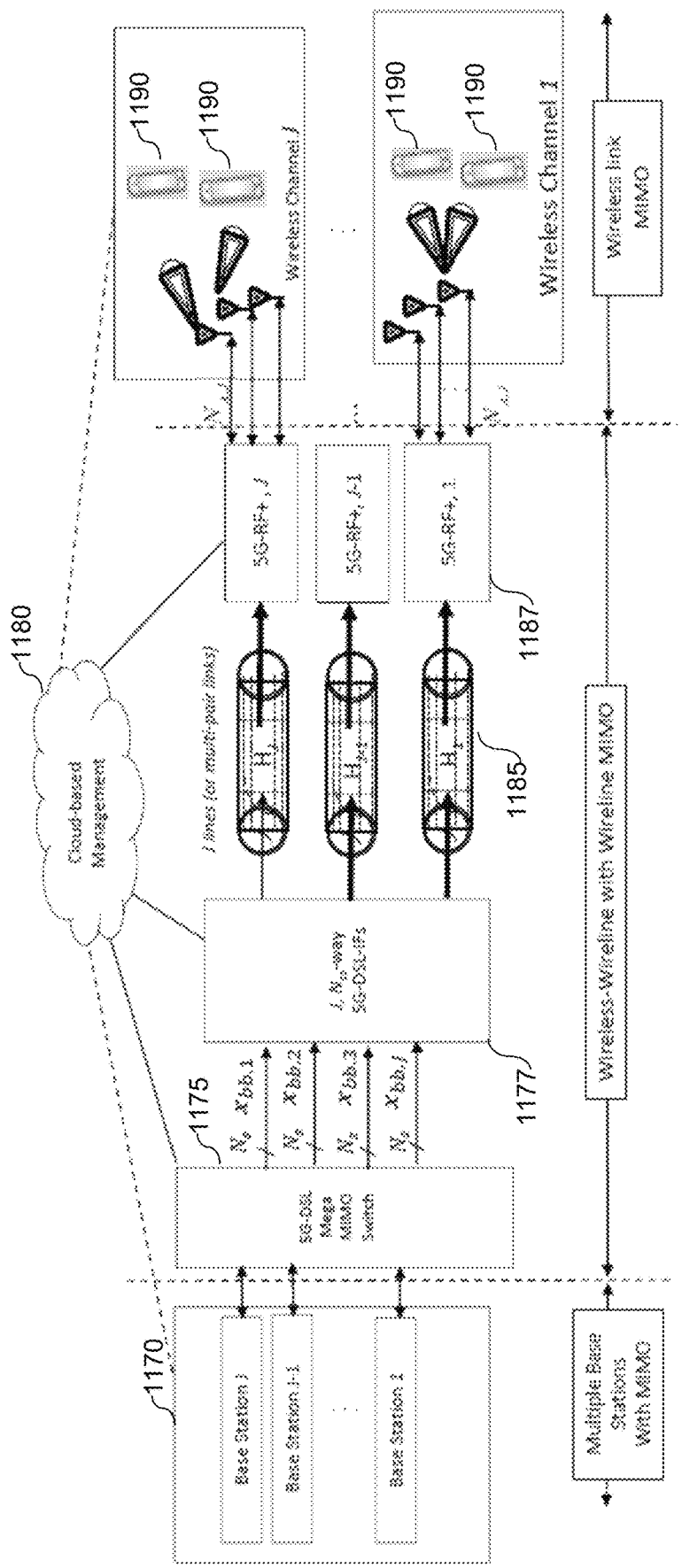
FIG. 11D illustrates a Mega MIMO deployment in which wireline-based MIMO may be implemented within the wireline part of the wireless-wireline architecture, in addition to the existing wireless MIMO implemented in the wireless base stations, according to various embodiments of the invention.

The Y5G-Ethernet concept of the previous subsection can be extended to (cellular) 5G-DSL over wireline and enhanced with the inclusion of copper-based MIMO. FIG. 11D shows the resulting architecture according to various embodiments of the invention. One skilled in the art will recognize that the Mega MIMO concept may be applied to other wireless/cellular and wireline implementation than 5G and DSL.

One or more base stations 1170, such as 5G base station(s), are coupled to a Mega MIMO switch 1175 that provides signal steering into the wireline portion in which spatial streams, across multiple channels 1185, are steered within wires to reduce crosstalk. To better understand this Mega MIMO architecture, consider the general model of a communications channel (in this case a 5G wireless channel): $y=H_d x+n$. For a single base station, the Ha may have more output antennas than the base station's maximum number of spatial streams in certain embodiments. These antennas may be at multiple 5G-RF or 5G-RF+ locations.

The switch 1175 may be a permutation matrix across frequencies and base stations. This permutation matrix may be an orthogonal matrix according to various embodiments of the invention. However, one skilled in the art will recognize that the switch may be any unitary matrix.

By placing this additional (Y)5G-IF+ functionality into the 5G-DSL system, a 5G massive-MIMO system becomes Mega MIMO. Typically, 5G Massive-MIMO systems can handle up to 32 spatial streams, selecting from among 128 antennas. These streams may be routed through the permutation matrix 1175 to any of the m-way IF's 1177 at a common vector IF location. Multiple baseband base stations (up to J of them in FIG. 11D) can have their spatial streams 1185 (currently up to 32 each, but more generally $N_{ss}$) connected to this switch. A cloud-controlled vector IF may then assign spatial dimensions, spectral dimensions, or both, to the various MU-MIMO processing units that operate in the 5G base stations or other type of access point/base station. That capability expands with the cloud controller's imposition of an orthogonal matrix Q (that can include permutations) on the vectored 5G-IF's input.

Assigning different spectra to different spatial streams reduces crosstalk for the corresponding base station. Because the 5G-DSL micro cells use less power, this may be an acceptable trade-off in spectrum use to avert substantial spatial crosstalk (for instance in a case where both devices are colinear radially to the base station). Alternatively, one of the devices could be served by an adjacent cell (but it would appear because of the vectored IF's precoding as if it were in the same micro cell).

The Mega MIMO functionality in a multi-link wireless-wireline system may also be implemented using alternative equivalent MIMO architectures, particularly in special cases. For example, the 5G-IF and 5G-RF+ 1187 in FIG. 11D may contain MIMO functionality that focuses exclusively on the wireline crosstalk.

In particular, the J lines shown in FIG. 11D may be multi-pair links that exhibit significant crosstalk between their individual copper pairs. Adding MIMO capabilities using any of the existing wireline-based MIMO techniques to the 5G-IF and the 5G-RF+s will reduce crosstalk on the wireline links H1 through HJ, thereby reducing the MIMO processing in the base stations from the burden of handling the wireline crosstalk, and allowing more focus on the wireless crosstalk.

The resource allocation across such a massive network of networks may be performed using a cloud-based management 1180. Using a cloud-based system would allow efficient coordination across physically distinct (and even physically distant) networks and would enable even higher improvements in network throughput and stability.

Figure 12:
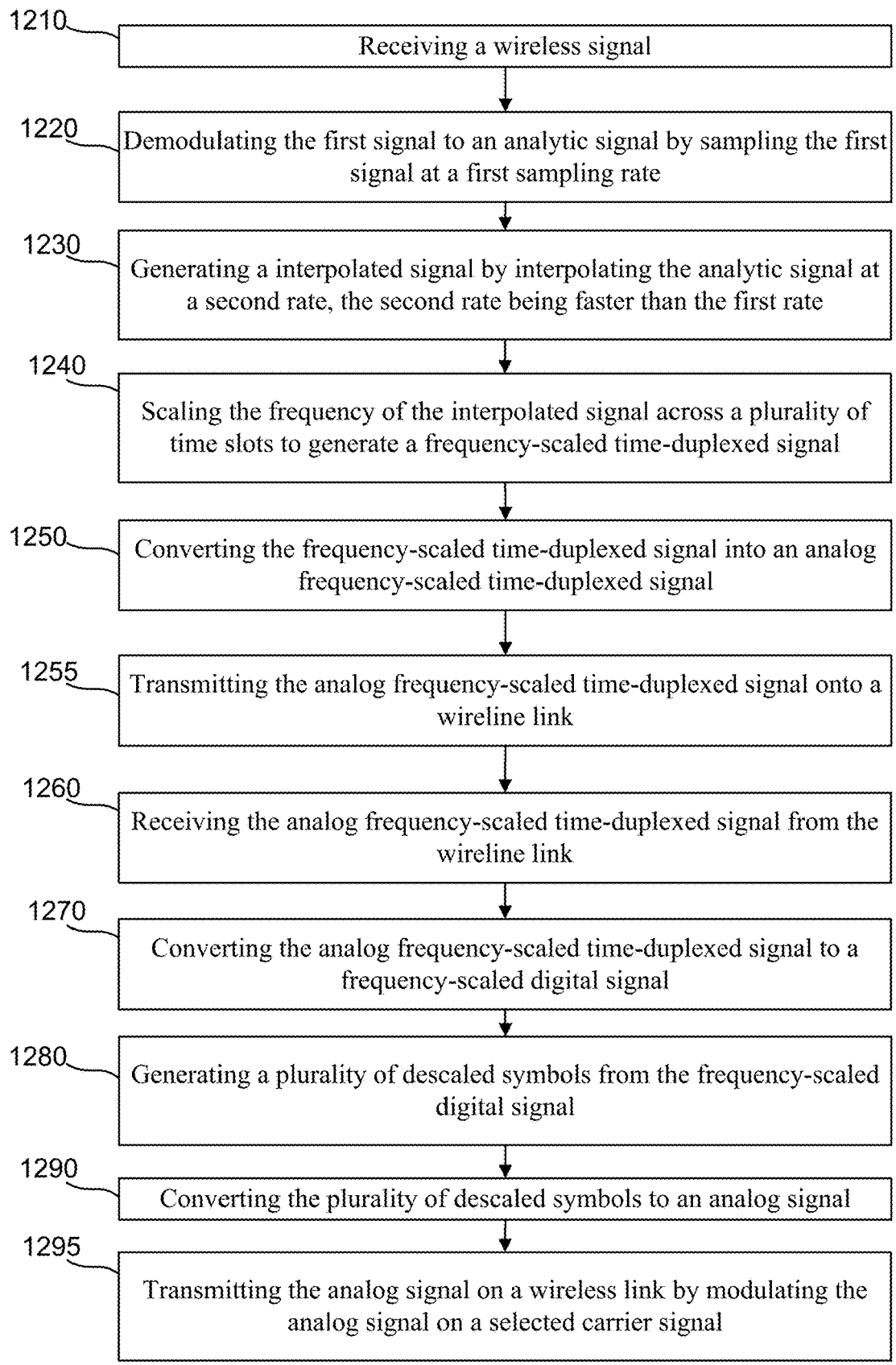
FIG. 12 is a flow diagram schematically illustrating an example method for communicating a wireless and wireline signal according to various embodiments of the invention.

FIG. 12 is a flow diagram schematically illustrating an example method for communicating a wireless and wireline signal, such as might be executed by a first node 162 and a second node 163 according to various embodiments of the invention. The method comprises the following steps.

At a step 1210 a wireless signal is received. This is typically carried out by a first node 162. As set out previously the wireless signal may be a signal in accordance with a wireless communication standard. For example, the wireless signal may be any of: an LTE signal, a 5G signal, a Wi-Fi signal. It will be appreciated that a Wi-Fi signal may be a signal in accordance with any of the Wi-Fi standards (including 802.11a, 802.11b, 802.11d, 802.11g, 802.11n, 802.11ac, 802.11ax, 802.11ay, etc.

At a step 1220, the wireless signal (refereed to hereafter as the first signal) is demodulated to form an analytic (or complex) signal. The step 1220 of demodulating comprises sampling the first signal at a first sampling rate. The first sampling rate may be predetermined based on the type (or wireless standard) of the wireless signal. One skilled in the art will understand that the first signal's frequency will depend on the protocol/standard under which it was generated, and that the first sampling rate will depend on the first signal's frequency.

At a step 1230, an interpolated signal is generated by interpolating the analytic signal at a second sampling rate. The second sampling rate is faster (or higher) than the first sampling rate. In particular, the second sampling rate may be twice the first sampling rate, and it will be appreciated that the second sampling rate could be more than twice the first sampling rate. One skilled in the art will recognize that the sampling steps occurring at demodulation 1220 and interpolation 1230 may be combined into a single interpolation operation (in the case of downlink) or decimation operation (in the case of uplink).

At a step 1240, a frequency-scaled time-duplexed signal is generated by scaling the frequency of the interpolated signal across a plurality of time slots. The frequency scaling is typically based on the intended type (or standard) of wireline signal.

The step 1240 may comprise outputting at least one buffered symbol from the interpolated signal at a third sampling rate. The third sampling rate may be selected based on the type (or standard) of wireline signal. The outputted at least one buffered symbol is used to generate the frequency-scaled time-duplexed signal. For example, the step 1240 may comprise a buffer storing a plurality of sampled symbols, the sampled symbols being within the interpolated signal. The step 1240 may comprise bursting the stored plurality of sampled symbols across the plurality of time slots to generate the frequency-scaled time-duplexed signal.

At a step 1250, the frequency-scaled time-duplexed signal is converted into an analog frequency-scaled time-duplexed signal. This is typically done by a digital to analog convertor.

At a step 1255, the analog frequency-scaled time-duplexed signal is transmitted onto a wireline link. As set out previously, the wireline link may be any suitable wireline type line. For example, the wireline link may be any of the following types: twisted pair, Ethernet, power line, single coax, etc.

It will be appreciated that some or all of the above steps may be performed at (or by) a first node 162 or a second node 163. The above steps may be thought of as a transmission (or re-transmission) method of an incoming wireless signal to a wireline signal.

The following steps may be thought of as a reception (or re-transmission) of an incoming wireline signal to a wireless signal. These may be carried out by a first node 162 or a second node 163.

At a step 1260, the analog frequency-scaled time-duplexed signal is received via (or from) from the wireline link.

At a step 1270, the analog frequency-scaled time-duplexed signal is converted to a frequency-scaled digital signal (or the frequency-scaled time-duplexed signal). This is typically done by an analog-to-digital converter.

At a step 1280, the frequency-scaled digital signal is descaled. The step 1280 comprises generating a plurality of descaled symbols from the frequency-scaled digital signal. The descaled symbols are generated at a fourth sampling rate. The fourth sampling rate is typically selected to accommodate the frequency-scaled digital signal. As such, the step 1280 may be thought of as a frequency-descaling buffer storing the plurality of sampled symbols from the frequency-scaled time-duplexed signal.

At a step 1290, the plurality of descaled symbols is converted to an analog signal.

At a step 1295, the analog signal is transmitted on a wireless link by modulating the analog signal on a selected carrier signal. Here, the carrier signal is selected as one appropriate for the type of required wireless signal.

The foregoing description of the invention has been described for purposes of clarity and understanding. It is not intended to limit the invention to the precise form disclosed. Various modifications may be possible within the scope and equivalence of the appended claims.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

What is claimed is:

1. A radio access node comprising:
a wireless interface that receives a wireless signal;
a demodulator coupled to the wireless interface, the demodulator generates an analytic signal from the wireless signal by sampling the wireless signal at a first sampling rate;
an interpolator coupled to receive the analytic signal, the interpolator generates an interpolated signal by interpolating the analytic signal at a second sampling rate, the second sampling rate being higher than the first sampling rate;
a frequency-scaling buffer coupled to receive the interpolated signal, the frequency-scaling buffer stores a plurality of sampled symbols within the interpolated signal and subsequently bursts the stored plurality of sampled symbols across a plurality of time slots to generate a frequency-scaled time-duplexed signal used for wireline communication;
a digital-to-analog converter that converts the frequency-scaled time-duplexed signal into an analog frequency-scaled time-duplexed signal; and
a wireline interface that transmits the analog frequency-scaled time-duplexed signal on a wireline link.

2. The radio access node of claim 1 wherein the radio access node operates in one of a plurality of modes.

3. The radio access node of claim 1 wherein the radio access node transmits in a downlink direction during a first period of time and transmits in an uplink direction during a second period of time.

4. The radio access node of claim 2 wherein the radio access node operates in a fast-buffer mode, among the plurality of modes, by changing directions at each symbol.

5. The radio access node of claim 2 wherein the radio access node operates in a Long-Term Evolution (LTE)-latency mode, among the plurality of modes, by adding a delay slot to the plurality of slots to increase cyclic-prefix length on the wireline link.

6. The radio access node of claim 1 wherein the wireless signal is a 5G cellular signal.

7. The radio access node of claim 6 wherein the wireless signal is a frequency division multiplexed signal.

8. A wireline-to-wireless access node comprising:
a wireline interface that receives a frequency-scaled time-duplexed signal;
an analog-to-digital converter coupled to the wireline interface, the analog-to-digital converter converts the frequency-scaled time-duplexed signal to a frequency-scaled digital signal;
a frequency-descaling buffer coupled to receive the frequency-scaled digital signal, the frequency-descaling buffer stores a plurality of symbols within the frequency-scaled digital signal and subsequently outputs descaled samples at a first rate;
a digital-to-analog converter coupled to receive the outputted descaled samples, the digital-to-analog converter converts the descaled samples to a descaled analog signal; and
a wireless interface coupled to receive the descaled analog signal, the wireless interface modulates the descaled analog signal to a selected channel carrier frequency and transmits the modulated analog signal on a wireless link.

9. The wireline-to-wireless access node of claim 8 wherein the wireless link is a 5G cellular link.

10. The wireline-to-wireless access node of claim 8 wherein the plurality of symbols are gated into the frequency-descaling buffer by a Long-Term Evolution (LTE) 2-kHz slot clock.

11. The wireline-to-wireless access node of claim 8 wherein the wireline-to-wireless access node operates in one of a plurality of modes.

12. The wireline-to-wireless access node of claim 11 wherein the wireline-to-wireless access node operates in a fast-buffer mode or a Long-Term Evolution (LTE)-latency mode, among the plurality of modes.

13. A method for communicating a wireless and wireline signal, the method comprising:
receiving a wireless signal;
demodulating the first signal to an analytic signal by sampling the first signal at a first sampling rate;
generating an interpolated signal by interpolating the analytic signal at a second rate, the second rate being faster than the first rate;
scaling the frequency of the interpolated signal across a plurality of time slots to generate a frequency-scaled time-duplexed signal;
converting the frequency-scaled time-duplexed signal into an analog frequency-scaled time-duplexed signal;
transmitting the analog frequency-scaled time-duplexed signal onto a wireline link;
receiving the analog frequency-scaled time-duplexed signal from the wireline link;
converting the analog frequency-scaled time-duplexed signal to a frequency-scaled digital signal;
generating a plurality of descaled symbols from the frequency-scaled digital signal;
converting the plurality of descaled symbols to an analog signal; and
transmitting the analog signal on a wireless link by modulating the analog signal on a selected carrier signal.

14. The method of claim 13 wherein the scaling of the frequency of the interpolated signal is performed using a fast-buffer mode.

15. The method of claim 13 wherein the scaling of the frequency of the interpolated signal is performed using a Long-Term Evolution (LTE)-latency mode.

16. The method of claim 13 wherein the frequency scaling step uses a buffer to convert the interpolated signal into a time-duplexed signal.

17. The method of claim 13 wherein the wireless signal is a 5G cellular link.

18. The method of claim 17 wherein the wireless signal is a frequency division multiplexed signal.

19. The method of claim 13 wherein the wireline link comprises a twisted pair.

20. The method of claim 13 wherein the wireline link comprises an optical fiber connection.

* * * * *